US008809756B1

(12) United States Patent
Yoshida

(10) Patent No.: US 8,809,756 B1
(45) Date of Patent: Aug. 19, 2014

(54) VISION MEASURING DEVICE AND AUTO-FOCUSING CONTROL METHOD

(71) Applicant: Mitutoyo Corporation, Kawasaki (JP)

(72) Inventor: Hiroyuki Yoshida, Kure (JP)

(73) Assignee: Mitutoyo Corporation, Kawasaki-Shi (JP)

( * ) Notice: Subject to any disclaimer, the term of this patent is extended or adjusted under 35 U.S.C. 154(b) by 0 days.

(21) Appl. No.: 14/259,480

(22) Filed: Apr. 23, 2014

Related U.S. Application Data

(62) Division of application No. 13/368,640, filed on Feb. 8, 2012, now Pat. No. 8,766,153.

(30) Foreign Application Priority Data

Feb. 17, 2011 (JP) ................................. 2011-031481
Feb. 17, 2011 (JP) ................................. 2011-031482

(51) Int. Cl.
  *G05D 3/12* (2006.01)
  *G03B 13/36* (2006.01)
  *H04N 5/232* (2006.01)
  *G06T 7/00* (2006.01)

(52) U.S. Cl.
  CPC ............ *H04N 5/23212* (2013.01); *G03B 13/36* (2013.01); *G06T 7/0018* (2013.01)
  USPC .................. 250/201.2; 250/201.4; 250/201.7; 356/624; 73/1.81

(58) Field of Classification Search
  USPC ..................... 250/201.2, 201.4, 201.7, 208.1; 73/1.79, 1.81; 356/609, 624
  See application file for complete search history.

(56) References Cited

U.S. PATENT DOCUMENTS 7,030,351 B2 * 4/2006 Wasserman et al. ........ 250/201.3
2012/0187275 A1 * 7/2012 Shirai et al. ................ 250/201.4

FOREIGN PATENT DOCUMENTS

JP       2001-319219       11/2001

* cited by examiner

*Primary Examiner* — Kevin Pyo
(74) *Attorney, Agent, or Firm* — Rankin, Hill & Clark LLP

(57) ABSTRACT

A vision measuring device includes: a camera which images a workpiece and transfers image information of the workpiece; a position control unit which controls an in-focus position of the camera and outputs the in-focus position as position information representing a position in a Z-axis direction; and a vision measuring machine which performs vision measurement on the workpiece based on image information and position information. The position control unit acquires and retains position information in response to a trigger signal output from the camera or the position control unit to the other at a certain timing of an imaging period during which the camera images the workpiece. The vision measuring machine calculates position information representing a position of image information in the Z-axis direction based on image information transferred from the camera and position information output from the position control unit, and performs auto-focusing control.

9 Claims, 29 Drawing Sheets

VISION MEASURING DEVICE AND AUTO-FOCUSING CONTROL METHOD

CROSS REFERENCE TO RELATED APPLICATIONS

This application is based on and claims the benefit of priority from prior Japanese Patent Application No. 2011-031481, filed on Feb. 17, 2011, and Japanese Patent Application No. 2011-031482, filed on Feb. 17, 2011, the entire contents of which are incorporated herein by reference.

BACKGROUND OF THE INVENTION

1. Field of the Invention

The present invention relates to a vision measuring device which measures a measuring target contactlessly based on images acquired by imaging the measuring target, and an auto-focusing control method.

2. Description of the Related Art

Vision measuring devices are required to be highly accurate as compared with digital cameras for general consumers, depending on the purposes, to be good at throughput. To satisfy such requirements and perform quick and highly-accurate measurement, a three-dimensional vision measuring device having an auto-focusing function is disclosed in JP2001-319219A.

In contrast-type auto-focusing, imaging is performed by gradually changing the in-focus position of an imaging device such as a camera, and the in-focus position is determined based on the contrast of the acquired images. Such a method can be realized by a simple configuration including, for example, only a camera and software. However, depending on the communication system for connecting the camera and the software, an indeterminate delay or drop frame might occur while images are being transferred due to communication confliction, etc., or a fixed gap might occur between the position at which image shooting is performed and the position at which a resulting image is acquired because the imaging device performs imaging while it is moving. Hence, it becomes impossible to determine the actual position at which the image is acquired, and hence to obtain the correct in-focus position. Moreover, this gap is different from device to device because of their own individual characteristics, and such handlings as individual calibration is needed because the gap directly becomes a measurement error.

SUMMARY OF THE INVENTION

To solve the problems of the conventional technique described above, an object of the present invention is to provide a vision measuring device which can calibrate any measurement error at a low cost and realize highly-accurate and high-speed contrast-type auto-focusing, and an auto-focusing control method.

To overcome the problems described above and achieve the object, a vision measuring device according to one embodiment of the present invention includes: imaging device which images a measurement target and transfers image information representing an image of the measurement target; position control device which controls an in-focus position of the imaging device and outputs the in-focus position as position information representing a position in an in-focus axis direction; and vision measuring device which performs vision measurement on the measurement target based on the image information and the position information, wherein: the position control device acquires and retains the position information in response to a trigger signal which is output from one of the imaging device and the position control device to the other of them at a certain timing of an imaging period during which the imaging device images the measurement target; and the vision measuring device calculates position information representing a position of the image information in the in-focus axis direction based on the image information transferred from the imaging device and the position information output from the position control device, and performs auto-focusing control by using the calculated position information.

The imaging device and the position control device are connected to the vision measuring device through, for example, a general-purpose serial communication wire, and the imaging device is connected to the position control device through, for example, a dedicated digital communication wire.

The trigger signal is, for example, a vertical synchronization (Vsync) signal, and the position control device acquires and retains the position information in response to the vertical synchronization signal which is output from the imaging device at an end point of the imaging period.

The trigger signal may be, for example, a strobe signal, and the position control device may acquire and retain the position information in response to the strobe signal which is output from the imaging device at a middle point of the imaging period.

The trigger signal may be, for example, an imaging start instruction signal. The imaging device may start imaging the measurement target in response to the imaging start instruction signal output from the position control device, and the position control device may acquire and retain the position information at the same time as outputting the imaging start instruction signal at a start point of the imaging period.

The imaging device may transfer the image information to the vision measuring device by adding serial number information to the image information. The position control device may retain the position information in association with the serial number information. The vision measuring device may calculate position information representing a position of the image information in the in-focus axis direction corresponding to the serial number information.

A vision measuring device according to another embodiment of the present invention includes: imaging device which images a measurement target and transfers image information representing an image of the measurement target; position control device which controls an in-focus position of the imaging device and outputs the in-focus position as position information representing a position in an in-focus axis direction; and vision measuring device which performs vision measurement on the measurement target based on the image information and the position information, wherein: the position control device acquires and retains the position information at a certain imaging timing of the imaging device; and the vision measuring device performs plural times of auto-focus searches along the in-focus axis direction by varying at least one of a moving velocity and a moving direction each time, obtains an amount of gap between the imaging timing and a timing at which the position information is acquired based on the image information transferred from the imaging device in each auto-focus search and the position information output from the position control device in each auto-focus search, and compensates for an in-focus position obtained in each auto-focus search based on the obtained amount of gap.

For example, the vision measuring device obtains an in-focus position based on the image information transferred from the imaging device in each auto-focus search and the position information output from the position control device in each auto-focus search, and obtains the amount of gap based on an error between the in-focus positions obtained in the respective auto-focus searches and the moving velocity of the imaging device.

For example, the vision measuring device sets a certain initial value for the amount of gap, calculates a compensation value for compensating for the amount of gap from a difference between the in-focus positions which have been compensated for based on the amount of gap in the respective auto-focus searches, and repeats a process for compensating for the amount of gap based on the compensation value until the compensation value becomes smaller than a certain value.

For example, the amount of gap is obtained by driving the imaging device in a first moving direction and in a second moving direction opposite to the first moving direction at the same moving velocity.

The amount of gap may be obtained by driving the imaging device in one moving direction at a first moving velocity and at a second moving velocity different from the first moving velocity.

Furthermore, the amount of gap may be obtained by driving the imaging device in a first moving direction at a first moving velocity and in a second moving direction opposite to the first moving direction at a second moving velocity different from the first moving velocity.

The amount of gap is, for example, a frame latency of the imaging device represented by time.

The amount of gap may be represented by a distance which is obtained by referring to a table based on the moving velocity and moving direction of the imaging device, a travel distance previously associated with the moving velocity, and a frame latency of the imaging device.

An auto-focusing control method according to another embodiment of the present invention is a auto-focusing control method of a vision measuring device including: imaging device which images a measurement target and transfers image information representing an image of the measurement target; position control device which controls an in-focus position of the imaging device and outputs the in-focus position as position information representing a position in an in-focus axis direction; and vision measuring device which performs vision measurement on the measurement target based on the image information and the position information, the method including: a step of the position control device acquiring and retaining the position information in response to a trigger signal which is output from one of the imaging device and the position control device to the other of them at a certain timing of an imaging period during which the imaging device images the measurement target; and a step of the vision measuring device calculating position information representing a position of the image information in the in-focus axis direction based on the image information transferred from the imaging device and the position information output from the position control device, and performing auto-focusing control by using the calculated position information.

An auto-focusing control method according to another embodiment of the present invention is an auto-focusing control method of a vision measuring device including: imaging device which images a measurement target and transfers image information representing an image of the measurement target; position control device which controls an in-focus position of the imaging device and outputs the in-focus position as position information representing a position in an in-focus axis direction; and vision measuring device which performs vision measurement on the measurement target based on the image information and the position information, the method including: a step of the position control device acquiring and retaining the position information at a certain imaging timing of the imaging device; and a step of the vision measuring device performing plural times of auto-focus searches along the in-focus axis direction by varying at least one of a moving velocity and a moving direction each time, obtaining an amount of gap between the imaging timing and a timing at which the position information is acquired based on the image information transferred from the imaging device in each auto-focus search and the position information output from the position control device in each auto-focus search, and compensating for an in-focus position obtained in each auto-focus search based on the obtained amount of gap.

Effects of the Invention

According to the present invention, it is possible to calibrate any measurement error at a low cost and realize highly-accurate and high-speed contrast-type auto-focusing.

DETAILED DESCRIPTION OF THE EMBODIMENTS

The embodiments of the vision measuring device and auto-focusing control method according to the present invention will be explained below in detail with reference to the attached drawings.

First Embodiment

Figure 1:
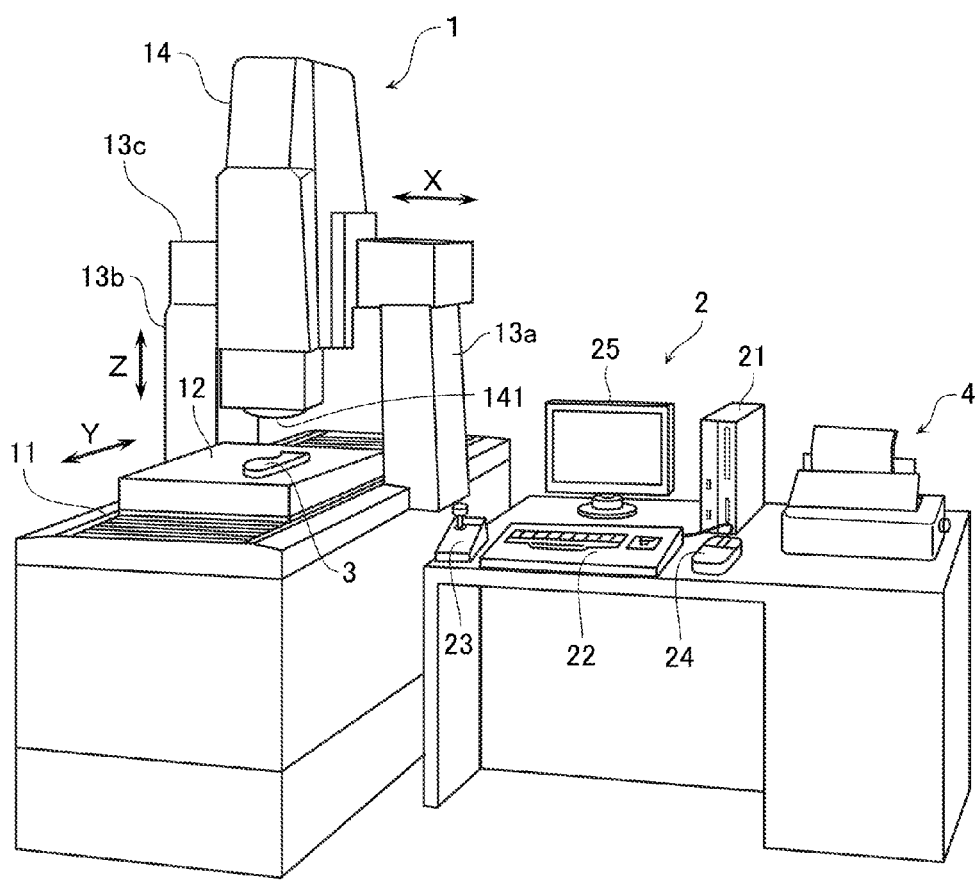
FIG. 1 is a diagram showing the whole configuration of a vision measuring device according to a first embodiment of the present invention.
Figure 2:
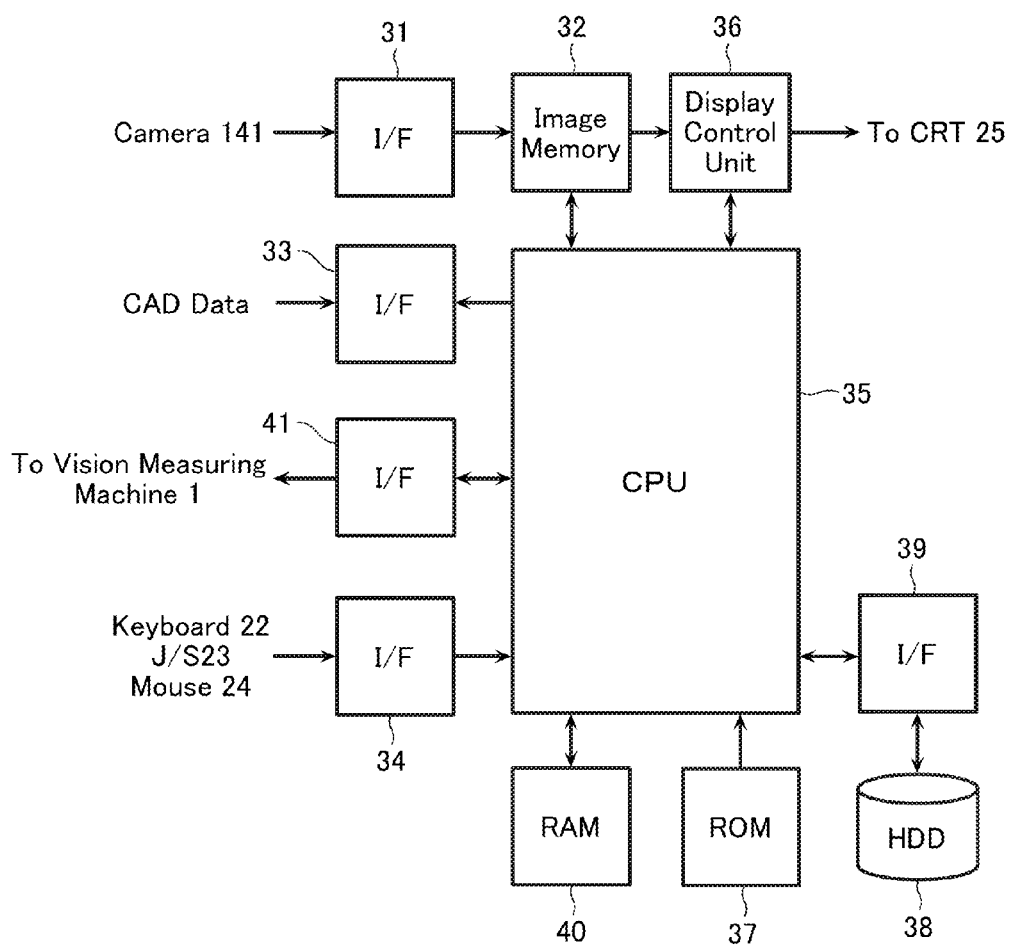
FIG. 2 is a block diagram showing some components of the same vision measuring device.
Figure 3:
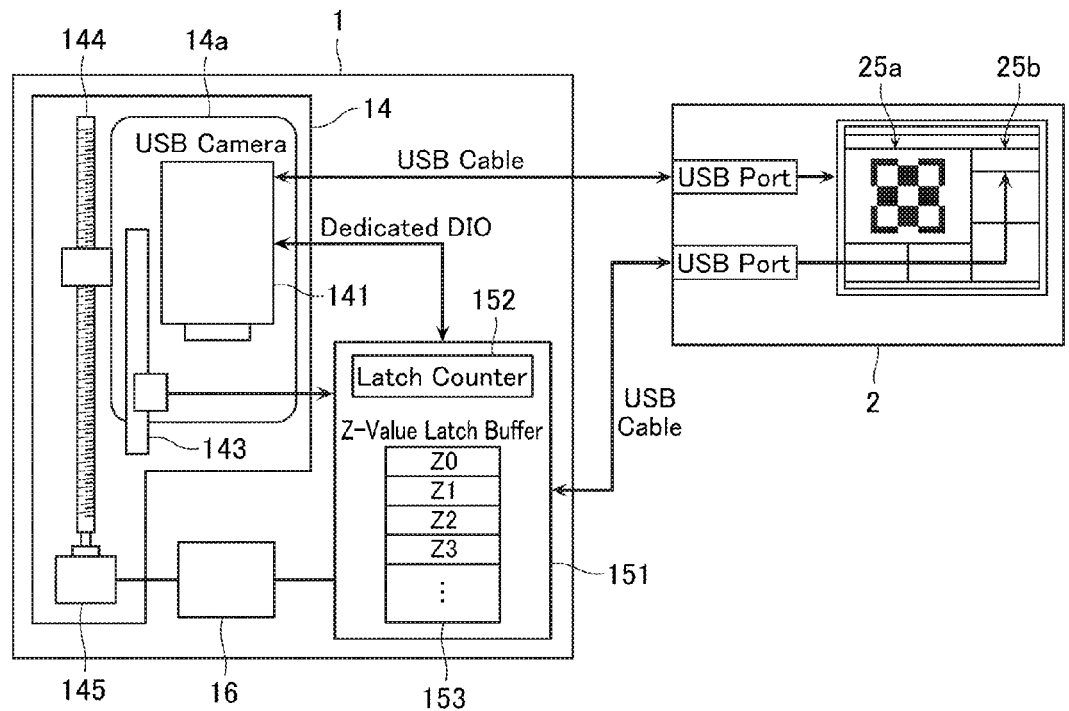
FIG. 3 is a block diagram showing some components of the same vision measuring device.

FIG. 1 is a diagram showing the whole configuration of a vision measuring device according to the first embodiment of the present invention. FIG. 2 and FIG. 3 are block diagrams showing some components of this vision measuring device. The vision measuring device includes a contactless vision measuring machine 1, and a computer system (hereinafter referred to as "PC") 2 which drives and controls the vision measuring machine 1 and execute necessary data processing. The PC 2 includes a printer 4 which prints out, for example, a measuring result.

The vision measuring machine 1 is configured as follows. Namely, a sample holder (stage) 12 is placed on a table 11 which is a sample moving device such that the top surface of the sample holder 12, which is a base surface, becomes a horizontal plane. An X-axis guide 13c is supported on the top ends of arm supports 13a and 13b that stand on both side ends of the table 11.

The sample holder 12 is configured to be drivable in a Y-axis direction by, for example, an unillustrated Y-axis driving mechanism provided on the table 11. An imaging unit 14 which is driven in an X-axis direction by an unillustrated X-axis driving mechanism is supported on the X-axis guide 13c.

A camera 141 is mounted on the lower end of the imaging unit 14 so as to face the sample holder 12. The camera 141 may be a camera of various types such as a CCD, a CMOS, etc. Though the first embodiment employs a manner of imaging from above, a workpiece 3 that is placed on the sample holder 12, it may employ any other manner such as a manner of imaging from a lateral side, a workpiece placed on the floor.

The PC 2 includes a computer main unit 21, a keyboard 22 as an inputting device, a joystick box (hereinafter referred to as "J/S") 23, a mouse 24, and a CRT 25 as one example of a display. The computer main unit 21 is configured as shown in FIG. 2, for example.

Namely, image information representing an acquired image of the workpiece 3 input into the computer main body 21 as transferred from the camera 141 through a USB cable as a general-purpose digital serial communication wire and a USB port (see FIG. 3) is stored as a multi-valued image in an image memory 32 through an interface (hereinafter referred to as "I/F") 31.

When performing off-line teaching based on CAD data, the CAD data of the workpiece 3 generated by an unillustrated CAD system is input into a CPU 35 through an I/F 33. The CAD data input into the CPU 35 is developed into image information such as bit map, etc. by the CPU 35 and then stored in the image memory 32. The image information stored in the image memory 32 is displayed on the CRT 25 through a display control unit 36.

On the other hand, code information, position information, etc. input through the keyboard 22, the J/S 23, and the mouse 24 are input into the CPU 35 through an I/F 34. The CPU 35 executes a measurement executing process, a measurement result displaying process, etc. in accordance with various programs such as a measurement executing program, a measurement result displaying program, etc. including a macro program stored in a ROM 37 and an auto-focusing (AF) control program according to the present invention to be stored in a RAM 40 from a HDD 38 through an I/F 39.

The CPU 35 drives the vision measuring machine 1 through an I/F 41 in accordance with the above measurement executing process. For example, when displaying on a video window 25a (see FIG. 3) on the CRT 25, an image of the workpiece 3 that is outside the imaging range of the camera 141 to be displayed on the CRT 25, the CPU 35 moves the sample holder 12 and the imaging unit 14 relatively in the X- and Y-axis directions by controlling the X- and Y-axis driving mechanisms of the vision measuring machine 1 based on input information input through the J/S 23 and the mouse 24 by an operator's operation.

Then, the CPU 35 drives the camera 141 in the Z-axis direction (in-focus axis direction) from the position of the camera 141 corresponding to the positions to which the sample holder 12 and the imaging unit 14 have been moved, by a later-described Z-axis driving mechanism, and executes an auto-focusing process to image the workpiece 3 at a focus position (in-focus position). Thereby, the CPU 35 displays an image of the workpiece 3 in a new imaging range on the CRT 25. The HDD 38 is a recording medium which stores the various programs described above, data, etc. The RAM 40 stores various programs and also provides a work area of the CPU 35 during various processes.

In the first embodiment, the vision measuring machine 1 includes an unillustrated controller. The controller includes a position control unit 151 (see FIG. 3). The PC 2 controls the in-focus position of the camera 141 through the position control unit 151. The PC 2 is configured to be capable of sending a signal designating a frame rate to the camera 141, a signal designating light volume of an unillustrated illumination device, etc.

The camera 141 images the workpiece 3 irradiated by the illumination device at the designated frame rate, and transfers image information of the acquired images to the PC 2 by bulk transfer through the USB cable, etc. as described above. At this time, the position control unit 151 sends the position information of the camera 141 to the PC 2 likewise through a USB cable and a USB port. Various types of illuminators can be used as the illumination device, and for example, a PWM-controlled LED, etc. can be used.

The imaging unit 14 includes a linear encoder 143 which detects and outputs the Z-coordinate of the camera 141, a camera driving mechanism 144 as a Z-axis driving mechanism which drives the camera 141 together with a measuring head 14a in the Z-axis direction, and a Z-axis motor 145 which drives the camera driving mechanism 144. The Z-axis motor 145 is connected to the position control unit 151 through a power unit 16 provided in the vision measuring machine 1.

The linear encoder 143 is mounted so as to allow a scale or the measuring (detecting) head 14a to move in the Z-axis direction in conjunction with the camera 141. The position control unit 151 measures the Z-coordinate of the camera 141 by an unillustrated counter, and outputs a Z-value which is position information. The position control unit 151 includes a latch counter 152 which counts the number of times z-values are output, and a Z-value latch buffer 153 which retains obtained Z-values in the form of array data.

Namely, the position control unit 151 is configured such that an unillustrated counter acquires and outputs Z-coordinate information of the camera 141 from the linear encoder 143 in response to a later-described trigger signal, the latch counter 152 counts the number of times such information is output, and the Z-value latch buffer 153 retains the Z-coordinate information as a Z-value. The camera 141 is connected to the position control unit 151 through a dedicated DIO (digital input/output) cable which is a dedicated digital communication wire.

The position control unit 151 outputs a Z-axis drive instruction to the power unit 16. The power unit 16 feeds a driving power to the Z-axis motor 145, and the Z-axis motor 145 moves the camera 141 in the focus direction by means of the camera driving mechanism 144. The camera 141 images the workpiece 3 at an arbitrary frame rate as described above, and transfers image information to the PC 2 through the USB cable, etc.

A trigger signal is output from one of the camera 141 and the position control unit 151 to the other of them. In the first embodiment, a camera master scheme is employed in which a vertical synchronization (Vsync) signal to be output from the camera 141 to the position control unit 151 is used as a trigger signal. In this case, the position control unit 151 receives the vertical synchronization signal, and in response to this, the unillustrated counter acquires and outputs a Z-coordinate from the linear encoder 143, the latch counter 152 counts the number of times such information is output, and the Z-value latch buffer 153 retains the Z-value.

Along with this, the latch counter 152 is updated, and the Z-value retained in the Z-value latch buffer 153 is output to the PC 2 as Z-value array data in response to a readout instruction (a request instruction) from the PC 2 and displayed on a counter window 25b (see FIG. 3) on the CRT 25. In the first embodiment, the camera 141 is driven in the Z-axis direction, but the same operation is available also by adjusting the optical system provided in the camera 141 such as a lens, etc. A USB interface is used as a general-purpose digital serial communication wire, but communication may be performed based on any other digital serial standard such as Gig-E, FireWire, etc.

Figure 4:
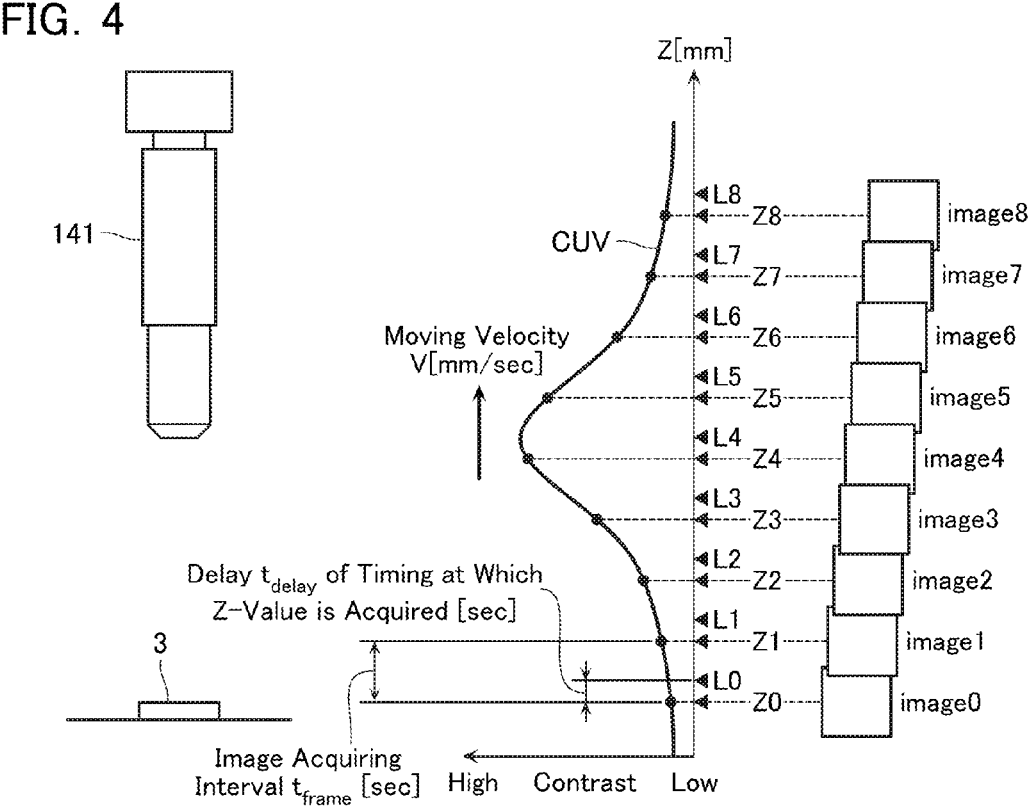
FIG. 4 is a diagram showing an auto-focusing method of the same vision measuring device.
Figure 5:
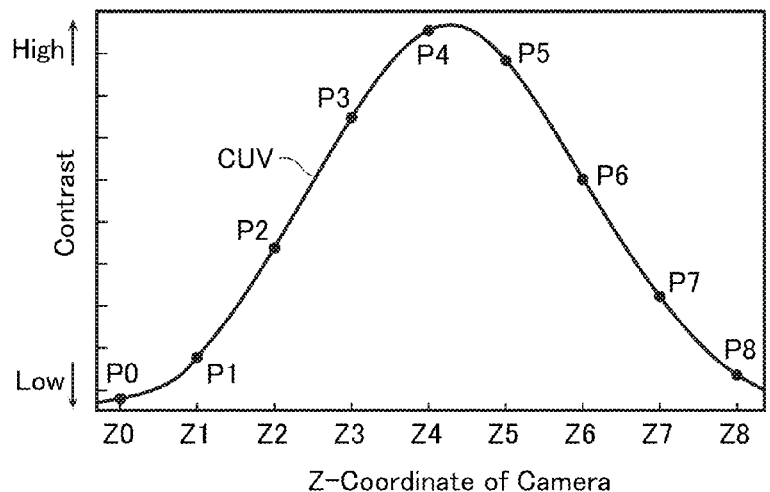
FIG. 5 is a diagram showing an auto-focusing method of the same vision measuring device.

The vision measuring device configured as described above performs an auto-focusing process as follows, for example, according to an auto-focusing control method of the present invention. FIG. 4 and FIG. 5 are diagrams showing an auto-focusing method of the vision measuring device. As shown in FIG. 4, in the auto-focusing process, first, the camera 141 is moved to an auto-focus search start position that is downward and close to the workpiece 3 or upward and far from the workpiece 3. Then, while the camera 141 is moved upward or downward at a moving velocity V (mm/sec), imaging is performed at a plurality of Z-coordinates (Z0 to Z8) at constant image acquiring intervals $t_{frame}$ (sec).

After this, contrasts are calculated from the image information at the respective z-coordinate positions, and hence a contrast curve CUV is obtained. The z-coordinate that corresponds to the highest contrast value among the plurality of calculated contrasts in the contrast curve CUV obtained in this way is judged as the focus (in-focus) position.

Suppose that imaging is performed at, for example, nine Z-coordinates (Z0 to Z8), and the PC 2 to which the images are transferred numbers the image information at Z0 to Z8 (image0 to image8) and calculates the contrasts (P0 to P8) at the respective Z-coordinates as shown in FIG. 5. In this case, the contrast P4 at the Z4 position is the highest. Therefore, the Z4 position is judged as the focus position, and the Z-coordinate of the camera 141 is set to Z4.

However, even though imaging is performed at nine Z-coordinates (Z0 to Z8), the Z-values (L0 to L8) to be actually latched by the position control unit 151 are gapped from the Z-coordinates (Z0 to Z8) at the imaging timings due to the influence of a delay $t_{delay}$ (sec) between the imaging timing and the timing at which the Z-value is acquired. The vision measuring device according to the first embodiment is configured to be able to calculate the peak position of the contrast curve CUV correctly even when such a gap occurs, by latching a Z-position in response to a vertical synchronization signal.

The Z-position at the imaging timing at which image information is acquired can be calculated by the following expression.

$$Z_i = \{L_{i+1} \cdot t_{delay} - L_i \cdot (t_{frame} - t_{delay})\}/t_{frame} + L_i \quad \text{[Expression 1]}$$

where i is the order of image acquisition

Here, in such contrast-type auto-focusing, it is possible to figure out a more correct focus position, by increasing image information output positions. However, if the output positions are increased, the amount of data to be sent from the camera 141 to the PC 2 is increased. Because the camera 141 and the PC 2 are connected through a USB cable, etc. as described above, the image information transfer speed is limited to, for example, approximately 400 Mbps at the maximum, which increases the time taken for auto-focusing.

Hence, the vision measuring device according to the first embodiment reduces the amount of data to be sent from the camera 141 to the PC 2 by sending only a partial image that is cut out from the image of the imaging range of the camera 141 during auto-focusing, thereby raising the frame rate.

Figure 6:
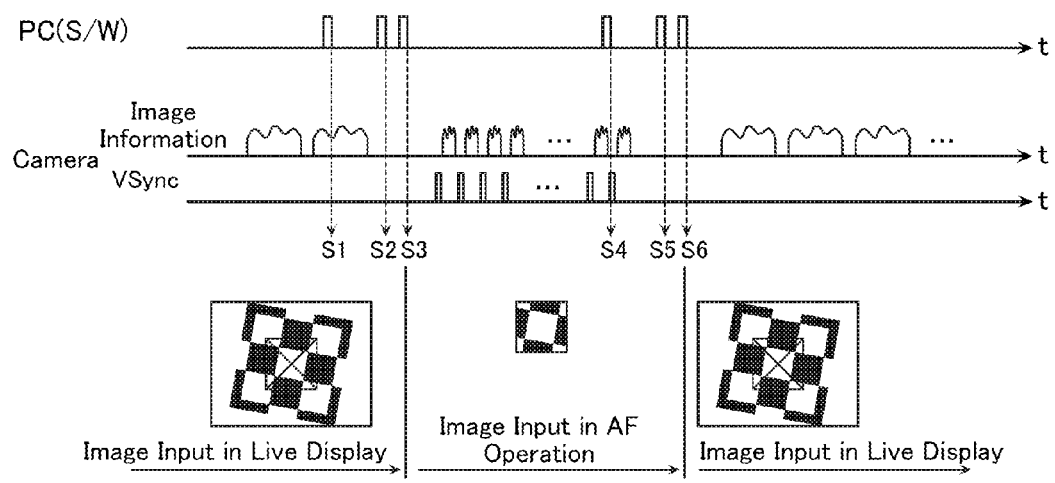
FIG. 6 is a timing chart showing an auto-focusing method of the same vision measuring device.

This transferring method will be explained with reference to FIG. 6. FIG. 6 is a timing chart showing an auto-focusing method of the vision measuring device, i.e., a timing chart showing the signals to be exchanged between the camera 141 and the PC 2 during auto-focusing. In FIG. 6, the upper row shows some of the signals to be sent from the software (hereinafter referred to as "S/W") of the PC 2 to the camera 141, and the lower row shows signals to be sent from the camera 141 to the S/W of the PC 2. In the following description, the PC 2 and its S/W will be collectively abbreviated as PC 2, unless otherwise specifically mentioned.

In the live display before auto-focusing is started, image information representing the whole imaging range is sent from the camera 141 to the PC 2. The image sent at this time is as shown in the lower left of FIG. 6, for example. Then, at the timing S1, an instruction to the effect that image output should be stopped is sent from the PC 2 to the camera 141.

When image output by the camera 141 is stopped, an instruction to the effect that the latch counter 152 should be reset is sent from the camera 141 to the position control unit 151. When the latch counter 152 is reset, the camera 141 is driven to the auto-focus search start position by the camera driving mechanism 144 as described above. As will be described later, the latch counter 152 may be reset after the camera 141 is moved to the auto-focus search start position.

At the timing S2, the range of the image to be sent from the PC 2 to the camera 141 is limited as shown in the lower center of FIG. 6, for example. At this time, an instruction to the effect that a vertical synchronization signal should be output may also be issued simultaneously. Then, at the timing S3, an instruction to the effect that image output should be started is sent from the PC 2 to the camera 141, and image information is output (transferred) from the camera 141 to the PC 2. As will be described later, serial number information (time stamp) may be output together with the image information.

When an instruction to the effect that a vertical synchronization signal should be output has been issued at the timing S2, a vertical synchronization signal is sent from the camera 141 to the position control unit 151, and hence the Z-coordinate of the camera 141 when it acquired the image is retained. When a time stamp described above is output, it may be retained together with the Z-coordinate.

When no vertical synchronization signal is used, a different way other than the way described later may be used to synchronize the camera 141 and the position control unit 151 such as calculating the imaging timing of the camera 141 from the frame rate of the camera 141 and obtaining the Z-coordinate of the camera 141 at the calculated timing.

At the timing S4 at which auto-focusing ends, an instruction to the effect that image output should be stopped is sent from the PC 2 to the camera 141. Then, at the timing S5, a signal to the effect that the settings of the camera 141 during the auto-focusing (the designation of the image output range and output of a vertical synchronization signal) should be canceled is sent.

Further, a Z-axis direction move stop instruction, a latch termination (stop) instruction, and a latch number readout (request) instruction are sent from the PC 2 to the position control unit 151. The position control unit 151 stops the camera 141 from moving, stops the operation of the latch counter 152 and Z-value latch buffer 153, and sends a latch number to the PC 2.

Then, an instruction to the effect that the Z-value array data latched in the position control unit 151 should be read out is sent from the PC 2 to the position control unit 151, and the Z-value array data (Z-coordinates, etc.) in the Z-value latch buffer 153 is sent from the position control unit 151 to the PC 2. The PC 2 finds matches between the transferred image information and the Z-coordinates and figures out the relationship between the contrasts calculated from the image information and the Z-values. After this, the PC 2 judges the focus position according to the method described above, and moves the camera 141 such that its Z-coordinate becomes the calculated focus position.

Finally, when an instruction to the effect that image output for live display should be resumed is output at the timing S6, the auto-focusing operation ends, and the normal measurement is resumed. The image to be transferred from the camera 141 to the PC 2 at this time has the same size as before the auto-focusing was started, as shown in the lower right of FIG. 6.

According to this method, the size of the image to be sent from the camera 141 to the PC 2 during auto-focusing is reduced, and the frame rate of the camera 141 can be increased significantly regardless of the transfer rate of the USB cable, etc.

Figure 7:
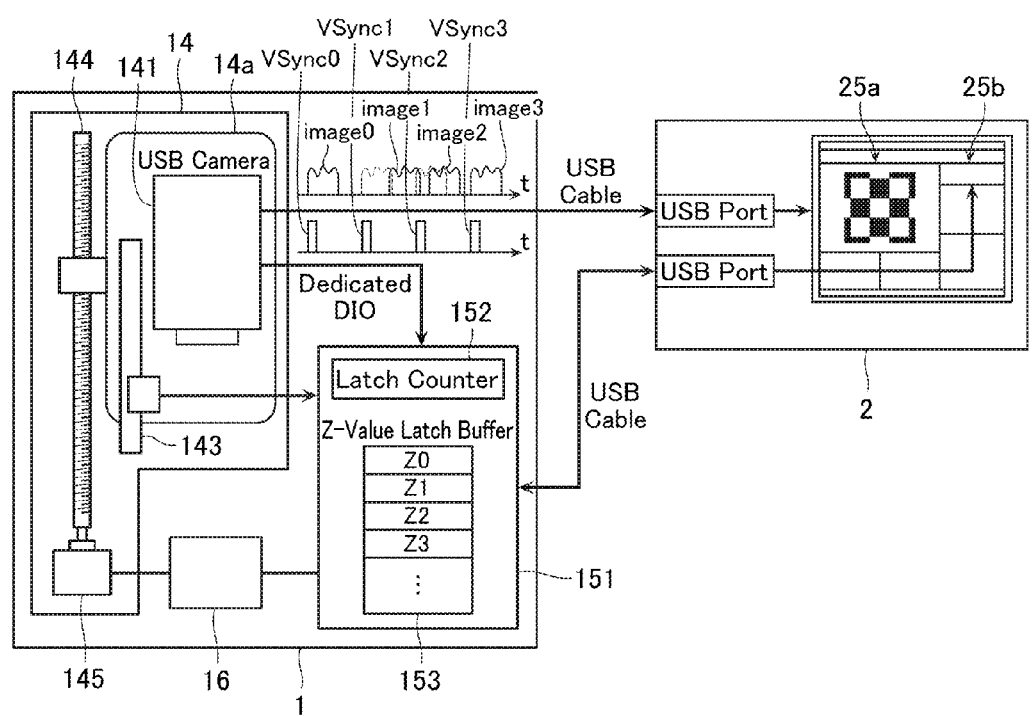
FIG. 7 is a block diagram showing some components of the same vision measuring device according to a camera master scheme using a vertical synchronization signal.
Figure 8:
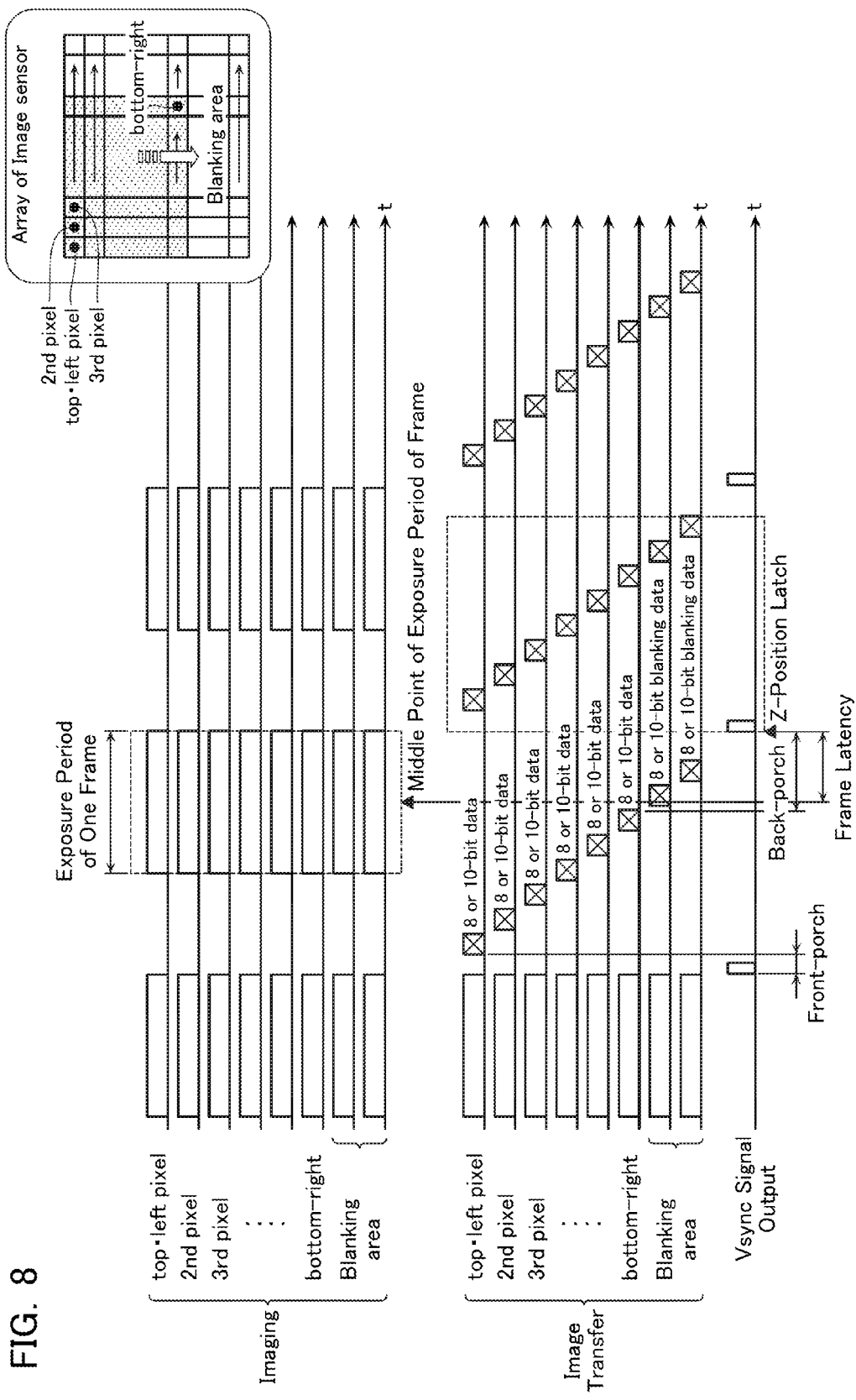
FIG. 8 is a timing chart showing timings at which the same vision measuring device outputs a vertical synchronization signal.
Figure 9:
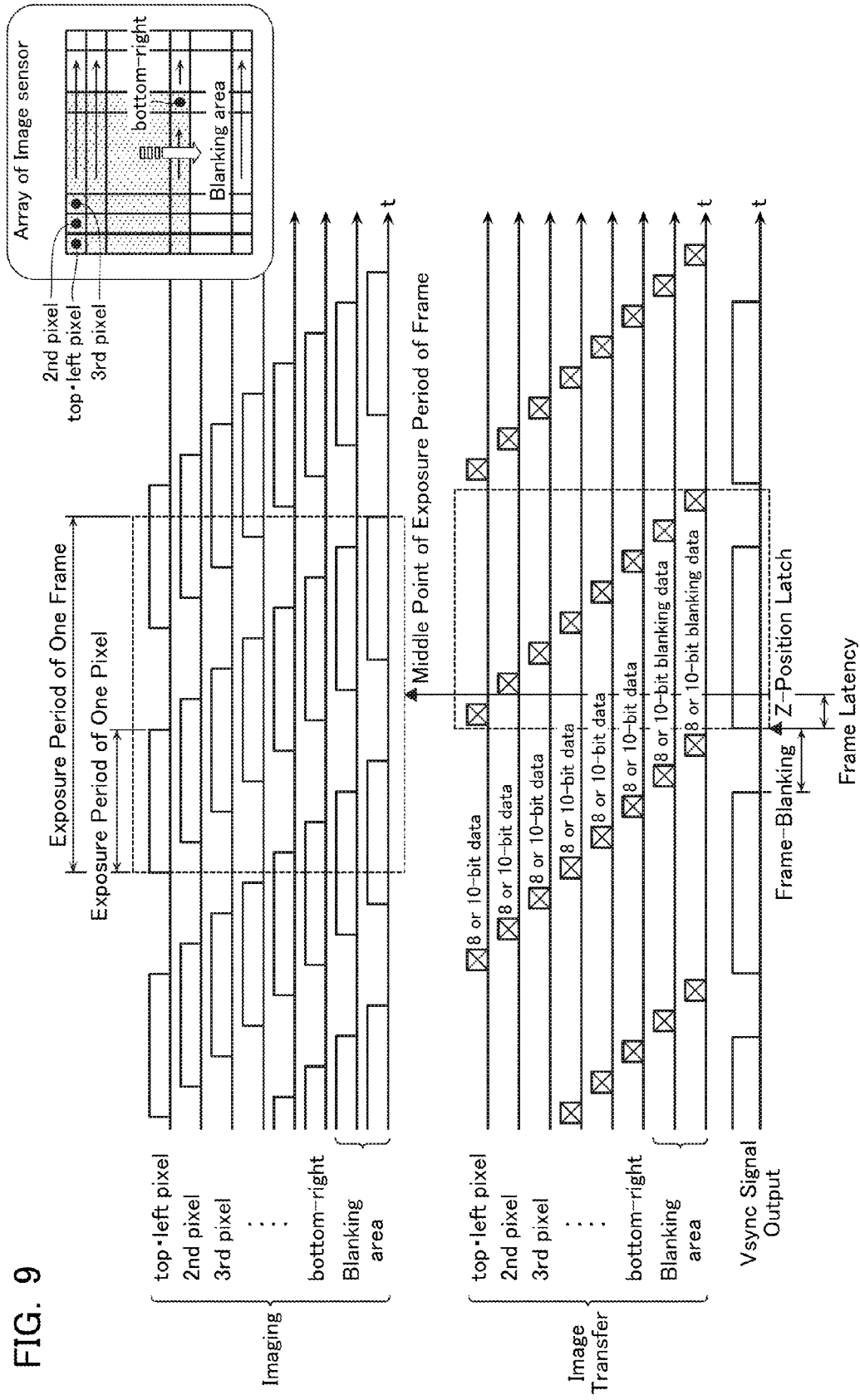
FIG. 9 is a timing chart showing timings at which the same vision measuring device outputs a vertical synchronization signal.
Figure 10A:
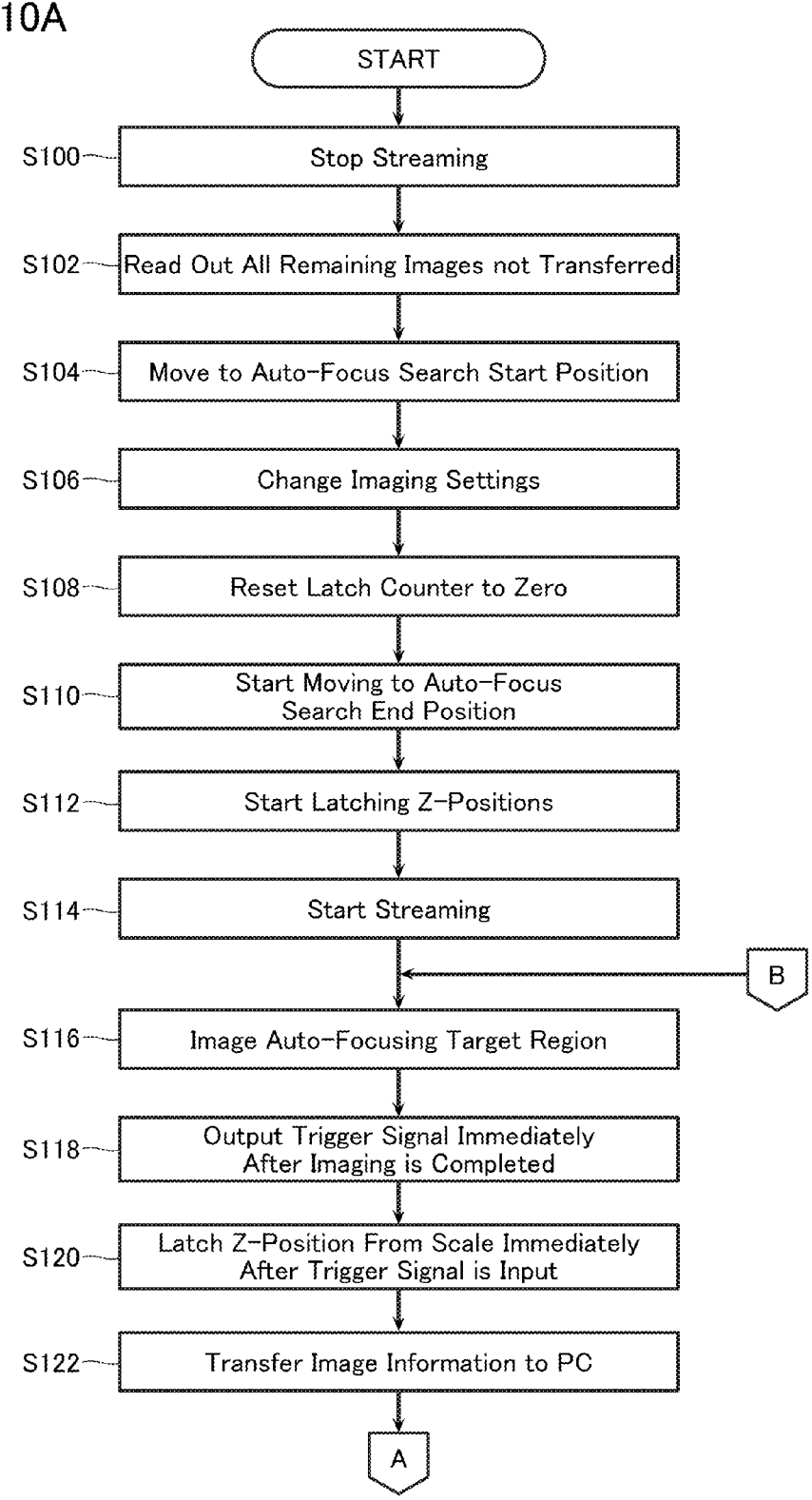
FIG. 10A is a flowchart showing procedures of an auto-focusing control process of the same vision measuring device.
Figure 10B:
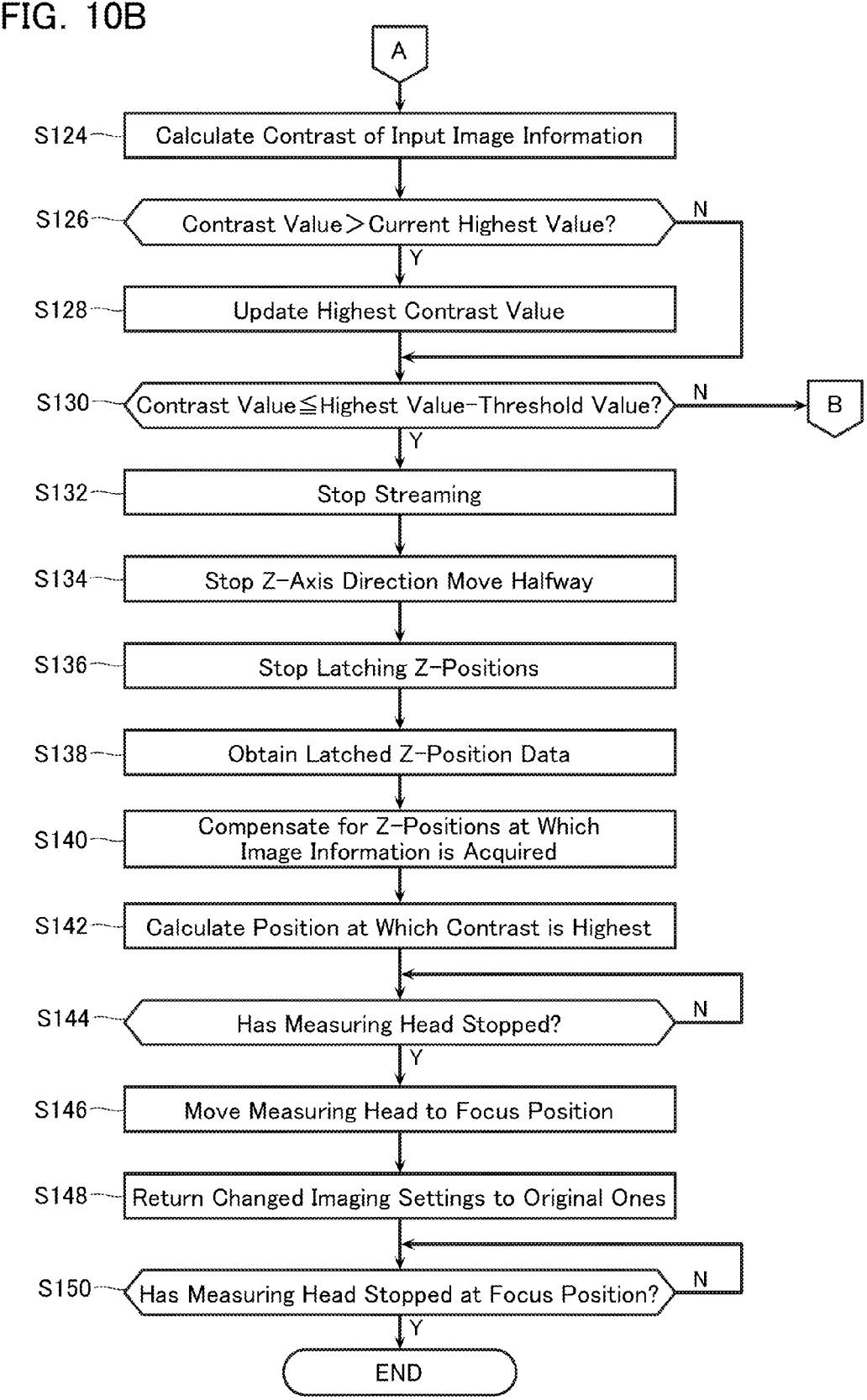
FIG. 10B is a flowchart showing procedures of an auto-focusing control process of the same vision measuring device.

Next, an auto-focusing process using a vertical synchronization signal based on a camera master scheme according to the first embodiment will be explained in detail. FIG. 7 is a block diagram showing some components of the vision measuring device based on a camera master scheme using a vertical synchronization signal. FIG. 8 and FIG. 9 are timing charts showing the timings at which the vision measuring device outputs a vertical synchronization signal. FIG. 10A and FIG. 10B are flowcharts showing procedures of an auto-focusing control process of the vision measuring device.

Figure 11:
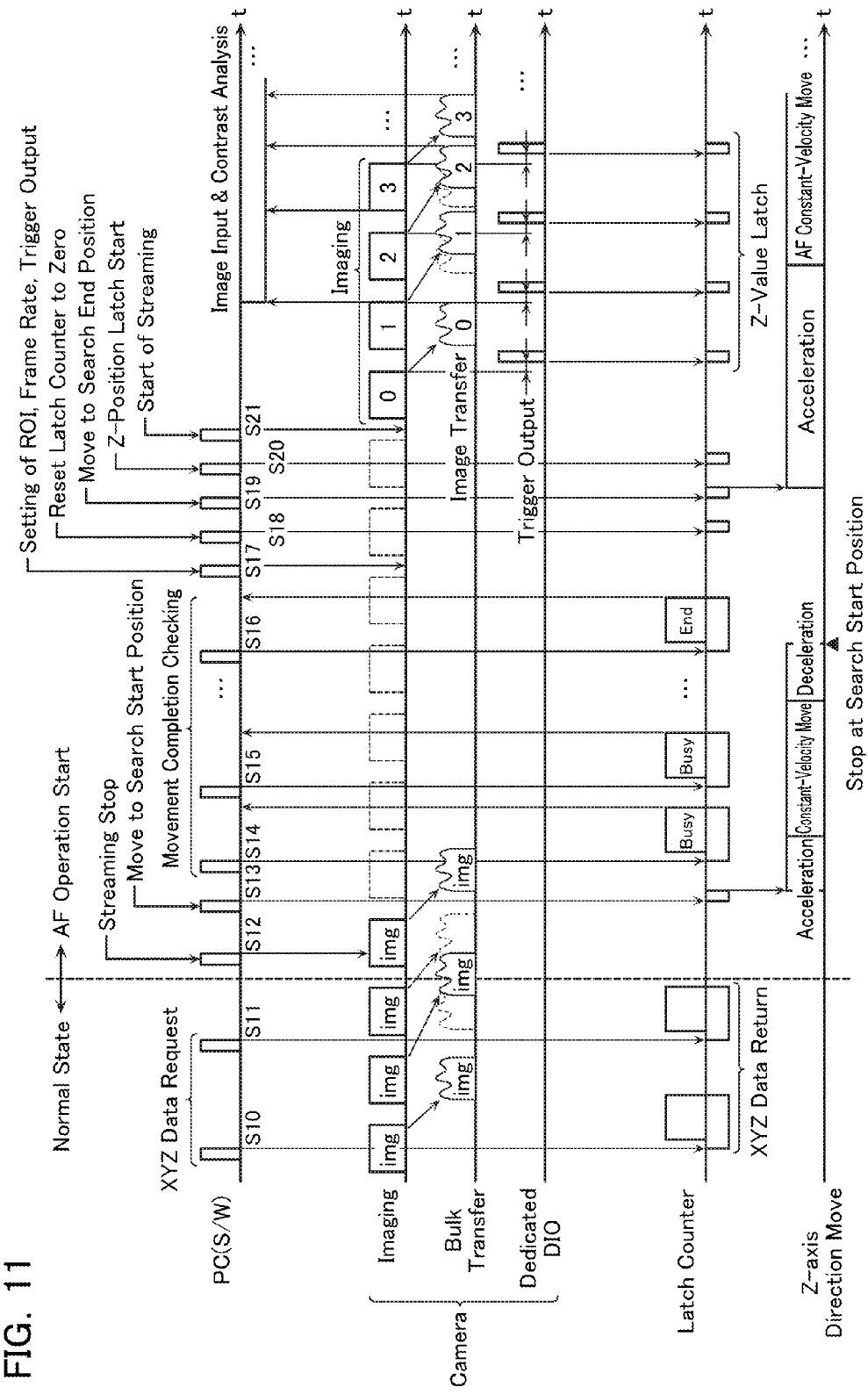
FIG. 11 is a timing chart showing procedures of an auto-focusing control process of the same vision measuring device.
Figure 12:
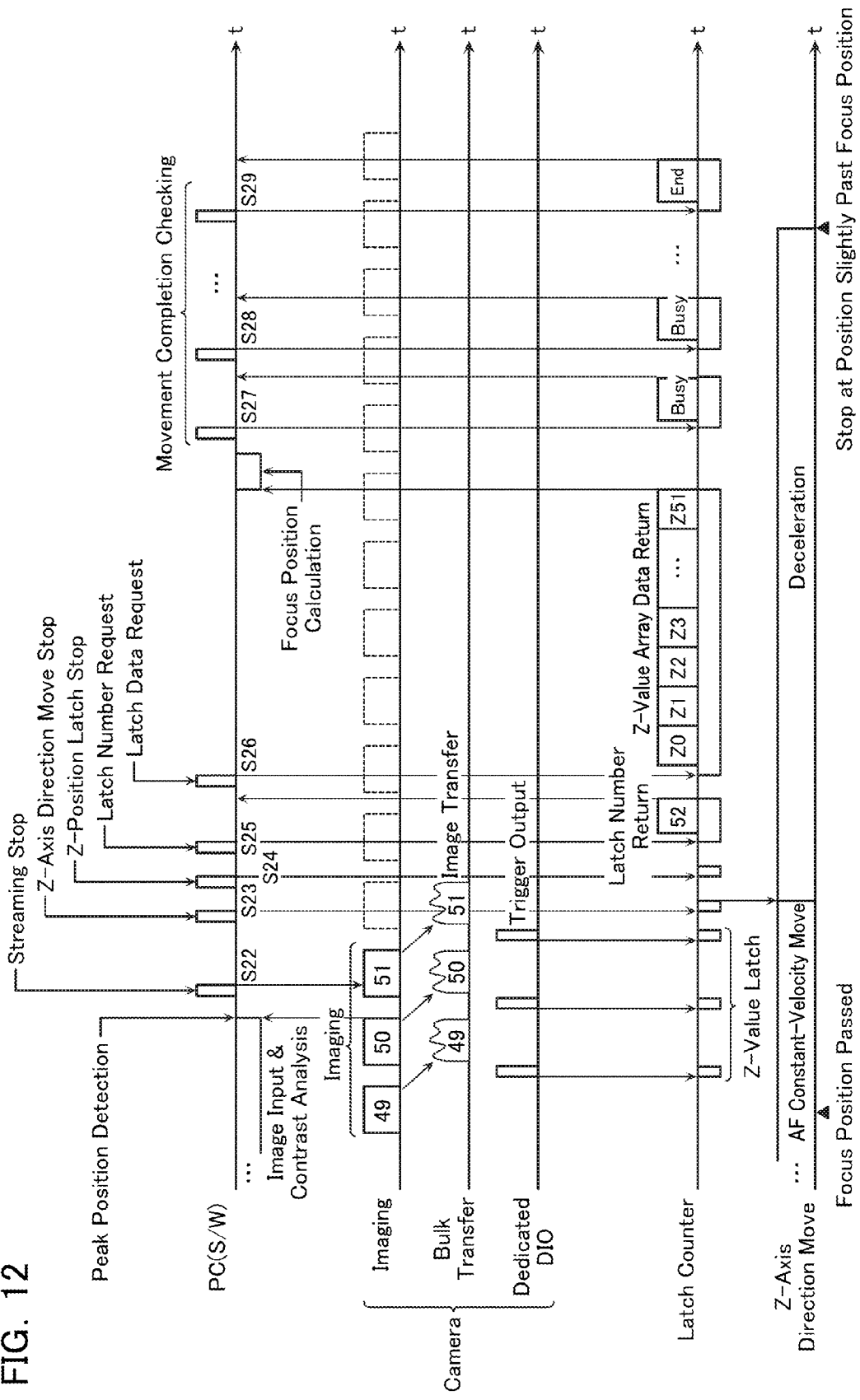
FIG. 12 is a timing chart showing procedures of an auto-focusing control process of the same vision measuring device.
Figure 13:
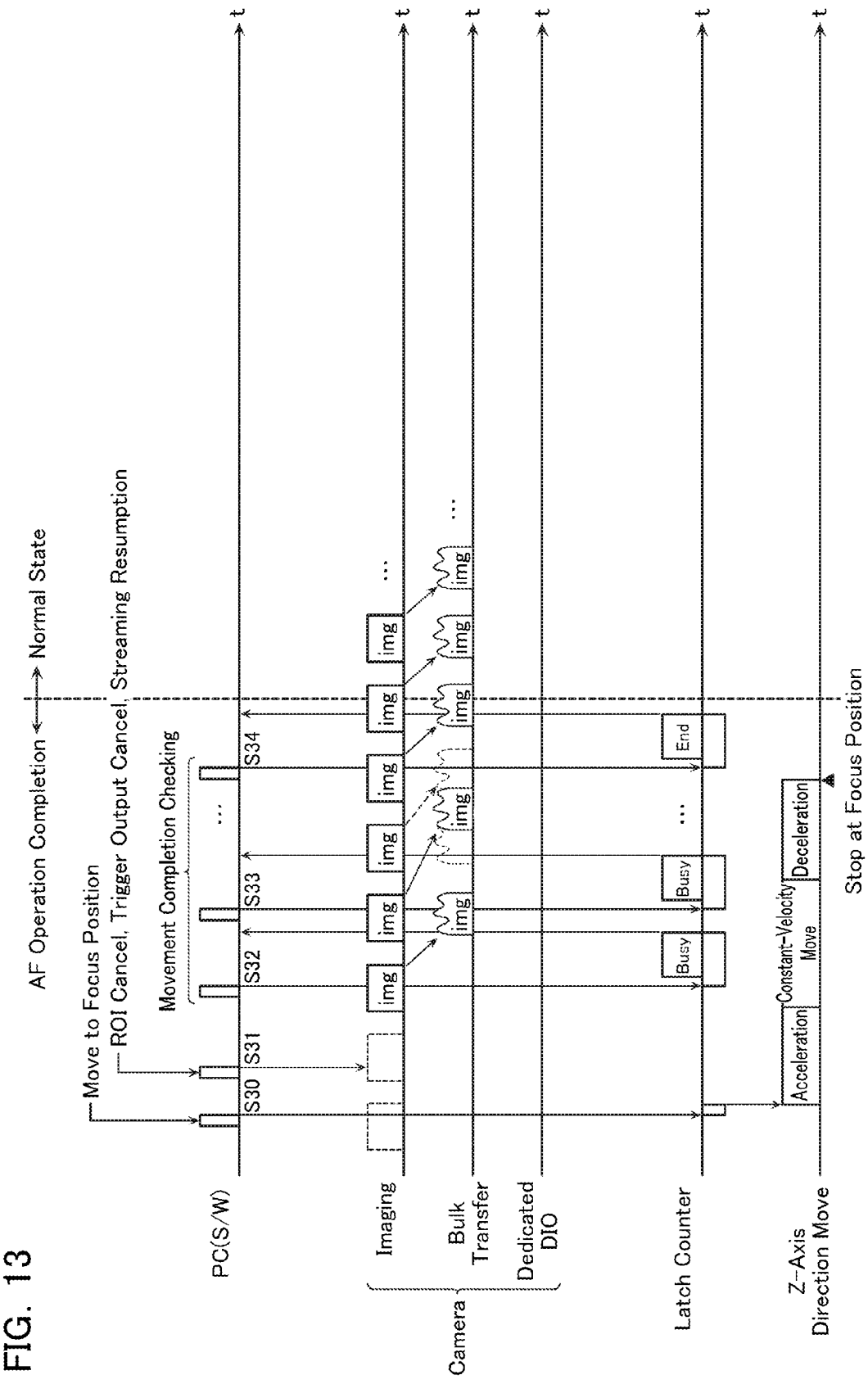
FIG. 13 is a timing chart showing procedures of an auto-focusing control process of the same vision measuring device.

FIG. 11 to FIG. 13 are timing charts showing procedures of an auto-focusing control process of the vision measuring device. The components shown in FIG. 7 are the same as those shown in FIG. 3. In this case, image information (image) is transferred from the camera 141 of the imaging unit 14 to the PC 2 through the USB cable, etc., and a vertical synchronization (Vsync) signal is output from the camera 141 to the position control unit 151 through the dedicated DIO cable after imaging of the workpiece 3 is completed.

Namely, when the camera 141 is configured by a CCD of a global shutter type as shown in FIG. 8, a vertical synchronization signal is output from the camera 141 at the end of an exposure period (imaging period) of one frame that is subsequent to the middle (middle point) of the exposure period by a gap period (=Frame Latency; hereinafter referred to as "FL") between the image acquiring timing and the timing at which a Z-position is acquired, where the exposure period of one frame is common to all pixels. The Z-coordinate (Z-position) at this end of the exposure period of one frame is latched by the position control unit 151.

On the other hand, when the camera 141 is configured by a CMOS of a rolling shutter type as shown in FIG. 9, the timings of the exposure periods of pixels lined up in the horizontal direction are gapped sequentially. Hence, a vertical synchronization signal is output from the camera 141 at the end of an exposure period of one pixel, which end is ahead of the middle point of an exposure period of one frame by FL likewise, where the exposure period of one frame is the combination of the exposure periods of all pixels. The Z-position at this end of the exposure period of one pixel is latched by the position control unit 151.

In the first embodiment, even when, for example, transfer of image information (for example, image2 and image3) from the camera 141 to the PC 2 is delayed due to a communication confliction or the like during the communication through the USB cable, etc. as shown in FIG. 7, the Z-position corresponding to each image information is latched by the position control unit 151 in response to a vertical synchronization signal that is output through the dedicated DIO cable after imaging is completed.

Hence, the PC 2 can calculate the peak position of the contrast curve CUV correctly by finding matches between the transferred image information and the Z-positions, ensuring a highly-accurate auto-focusing operation. Specifically, this auto-focusing operation is performed as follows, for example. The auto-focusing operation according to the first embodiment will be explained below with reference to the flowcharts of FIG. 10A and FIG. 10B and the timing charts of FIG. 11 to FIG. 13.

First, as shown in FIG. 11, in the normal state before auto-focusing is started, at the timings S10 and S11, a request instruction requesting data (XYZ data) of X-position, Y-position, and Z-position at which an image of the workpiece 3 is acquired is sent from the PC 2 to the latch counter 152. The camera 141 sends (outputs) image information acquired by serial shooting (Streaming) to the PC 2 by bulk transfer regardless of the XYZ data request timings. Here, "streaming" means sending images serially at the highest possible frame rate at which the camera 141 can transfer images.

Also, in response to the XYZ data request instruction, the position control unit 151 acquires X-coordinate, Y-coordinate, and Z-coordinate serially, and returns the acquired XYZ data to the PC 2. The PC 2 live displays the transferred image information on the video window 25a, and displays the returned XYZ data on the counter window 25b in real time.

When sending image information acquired in the normal state to the PC 2 by bulk transfer as described above, an indeterminate communication delay might occur, and hence troubles such as a delay of image information transfer, drop frame, etc. might sometimes occur. Hence, when the auto-focusing operation is started, the PC 2 sends a streaming stop instruction to the camera 141 at the timing S12, and the camera 141 having received the streaming stop instruction stops streaming (step S100), and reads out all of approximately 1 to 2 frames of images left un-transferred (step S102). Even after stopping streaming, the camera 141 operates within itself to continue imaging.

At the timing S13, an instruction to the effect that the camera 141 should be moved to the auto-focus search start position is sent from the PC 2 to the position control unit 151, and the measuring head 14a is moved to the auto-focus search start position by making an accelerated move, a constant-velocity move, and a decelerated move in the Z-axis direction (step S104). This operation is stopped when the camera 141 reaches the auto-focus search start position. This instruction to move can designate the destination position and the moving velocity, and the movement in the Z-axis direction is stopped according to movement completion checking performed at, for example, the timings S14, S15, . . . S16 for checking whether the Z-axis motor 145 has stopped or not.

When the measuring head 14a stops at the auto-focus search start position, a setting change instruction is sent from the PC 2 to the camera 141 at the timing S17, and the imaging settings of the camera 141 are changed (step S106). In this imaging setting change, the readout region (ROI) of the camera 141 is limited to only the auto-focusing target region to minimize the size of the image information to be transferred, the frame rate (=1/exposure period) is set to 60 or 50 fps, or whether or not to output a trigger signal is set.

Then, when the imaging settings of the camera 141 have been changed, an instruction to the effect that the latch counter 152 should be reset to zero is sent from the PC 2 to the position control unit 151 at the timings S18, and the latch counter 152 is reset to zero (step S108).

After this, at the timing S19, an instruction to the effect that the measuring head 14a should be moved to an auto-focus search end position is sent from the PC 2 to the position control unit 151, and the measuring head 14a starts to move to the auto-focus search end position by making an accelerated move, a constant-velocity move, and a decelerated move in the Z-axis direction (step S110). Once the instruction to move to the auto-focus search end position is issued, the measuring head 14a continues to move until it reaches the end position or alternatively until an interruptive stop instruction is issued.

At the timing S20, a latching start instruction is sent from the PC 2 to the position control unit 151, and latching of Z-positions as described above is started (step S112). Then, at the timing S21, a streaming start instruction is sent from the PC 2 to the camera 141, and in response, the camera 141 starts streaming (step S114).

Upon starting streaming, the camera 141 images the auto-focusing target region of the workpiece 3 (step S116), and immediately after completing imaging, outputs a vertical synchronization signal as a trigger signal to the position control unit 151 through the dedicated DIO cable (step S118). Note that in order to show a condition that resembles the actual operation, FIG. 11 shows that a trigger signal is always output after a certain delay from the completion of the imaging. Furthermore, FIG. 11 shows that image transfer after the completion of the imaging is subject to an indeterminate delay because images are transferred by bulk transfer.

Immediately after receiving the trigger signal, the position control unit 151 latches the Z-position (Z-value) from the scale of the linear encoder 143 by its unillustrated counter (step S120), and the camera 141 transfers the acquired image information to the PC 2 through the USB cable, etc. (step S122). Latching of Z-positions may be started during an accelerated move of the measuring head 14a. Then, the PC 2 receives the transferred image information, and conducts a contrast analysis of the received image information.

Namely, as shown in FIG. 10B, the PC 2 calculates the contrast of the received image information (step S124), and judges whether or not the calculated contrast value is the current highest (of all the values obtained so far) (step S126). When judged that it is the highest value (step S126; Y), the PC 2 updates the highest contrast value (step S128), and judges whether or not the contrast value is equal to or lower than a value obtained by subtracting a certain threshold value from the highest value, i.e., whether or not the camera 141 has passed the peak position (step S130). When judged at step S126 described above that the calculated contrast value is not the highest value (step S126; N), the PC 2 goes to step S130 and judges the same matter.

When judged that the contrast value is equal to or lower than the value obtained by subtracting the certain threshold value from the highest value (step S130; Y), as shown in FIG. 12, the PC 2 sends a streaming stop instruction to the camera 141 at the timing S22, and the camera 141 having received this streaming stop instruction stops streaming (step S132). On the other hand, when judged that the contrast value is not equal to or lower than the value obtained by subtracting the certain threshold value from the highest value (step S130; N), the PC 2 goes to step S116 described above and repeats the subsequent steps.

When the camera 141 stops streaming, the PC 2 sends a Z-axis direction move stop instruction to the position control unit 151 at the timing S23, and the position control unit 151 controls the Z-axis motor 145 to stop the movement in the Z-axis direction halfway (step S134). In response, the Z-axis direction move starts a decelerated move.

Then, at the timing S24, the PC 2 sends a Z-position latching stop instruction to the position control unit 151, and the unillustrated counter having received this instruction stops latching Z-positions (step S136). Because the camera 141 has stopped streaming at this timing, no vertical synchronization signal is output to the position control unit 151 through the dedicated DIO cable.

When latching of Z-positions is stopped, the PC 2 sends a latch number request instruction to the position control unit 151 at the timing S25, and the latch counter 152 having received this instruction returns the latch number to the PC 2. Then, at the timing S26, the PC 2 sends a latched data request instruction to the position control unit 151, the latch counter 152 of the position control unit 151 reads out the Z-value array data from the Z-value latch buffer 153 and returns it to the PC 2, and the PC 2 obtains the latched Z-position data (step S138).

The PC 2 compensates for the Z-positions at which the pieces of image information have been acquired based on the obtained Z-position data (step S140), and calculates the position (focus position) at which the contrast is the highest (step S142). A compensated Z-position can be calculated based on, for example, an amount of compensation=moving velocity V(mm/sec)×FL (sec).

When the focus position is calculated, movement completion checking for checking whether or not the Z-axis motor 145 has stopped is given at the timings S27, S28, . . . , S29 to judge whether or not the measuring head 14a has stopped (step S144). The movement in the Z-axis direction is stopped during the movement completion checking, and the measuring head 14a is stopped at a position slightly past the focus position.

Namely, based on a reply from the position control unit 151, the PC 2 waits until the measuring head 14a stops (step S144; N). When the measuring head 14a stops at the position slightly past the focus position as described above (step S144; Y), the PC 2 sends an instruction to move the measuring head 14a to the focus position to the position control unit 151 at the timing S30, as shown in FIG. 13. Then, the position control unit 151 having received this instruction controls the Z-axis motor 145 to let the measuring head 14a move to the focus position by making an accelerated move, a constant-velocity move, and a decelerated move in the Z-axis direction (step S146).

At the timing S31 during the movement of the measuring head 14a, the PC 2 sends a setting change instruction to the camera 141, and the camera 141 having received this instruction returns the imaging settings changed at step S106 described above to the original ones (step S148). After this, at the timings S32, S33, . . . , S34, movement completion checking for checking whether or not the Z-axis motor 145 has stopped is given to judge whether or not the measuring head 14a has stopped at the focus position (step S150).

Namely, based on a reply from the position control unit 151, the PC 2 waits until the measuring head 14a stops at the focus position (step S150; N). When the measuring head 14a stops at the focus position as described above (step S150; Y), the series of auto-focusing operation according to the flowcharts is completed, and the normal state described above returns.

The auto-focusing operation may end when the settings are changed at the timing S31 described above. In this case, processes irrelevant to the Z-axis direction move (for example, input or output of data, etc.) can be performed, and hence the throughput can be improved.

As can be understood from the above, even when a delay occurs while image information is transferred from the camera 141 due to a communication confliction, etc., the vision measuring device according to the first embodiment can obtain the focus position by calculating the peak position of the contrast curve CUV correctly based on the Z-positions corresponding to the respective pieces of image information latched in response to a vertical synchronization signal output after imaging is completed. This allows auto-focusing to be performed highly accurately and without fault.

Second Embodiment

Figure 14:
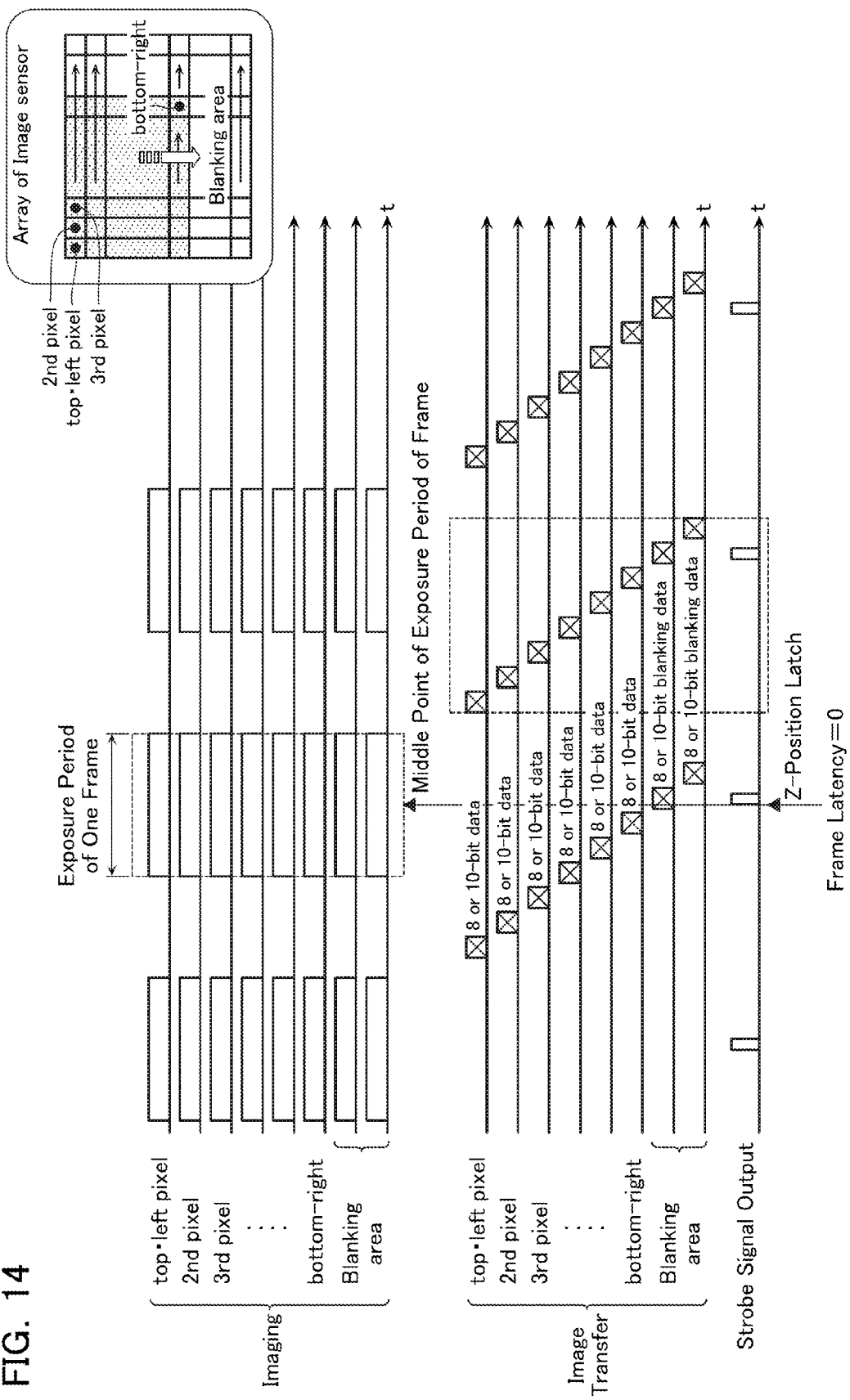
FIG. 14 is a timing chart showing timings at which a vision measuring device according to a second embodiment of the present invention outputs a strobe signal.
Figure 15:
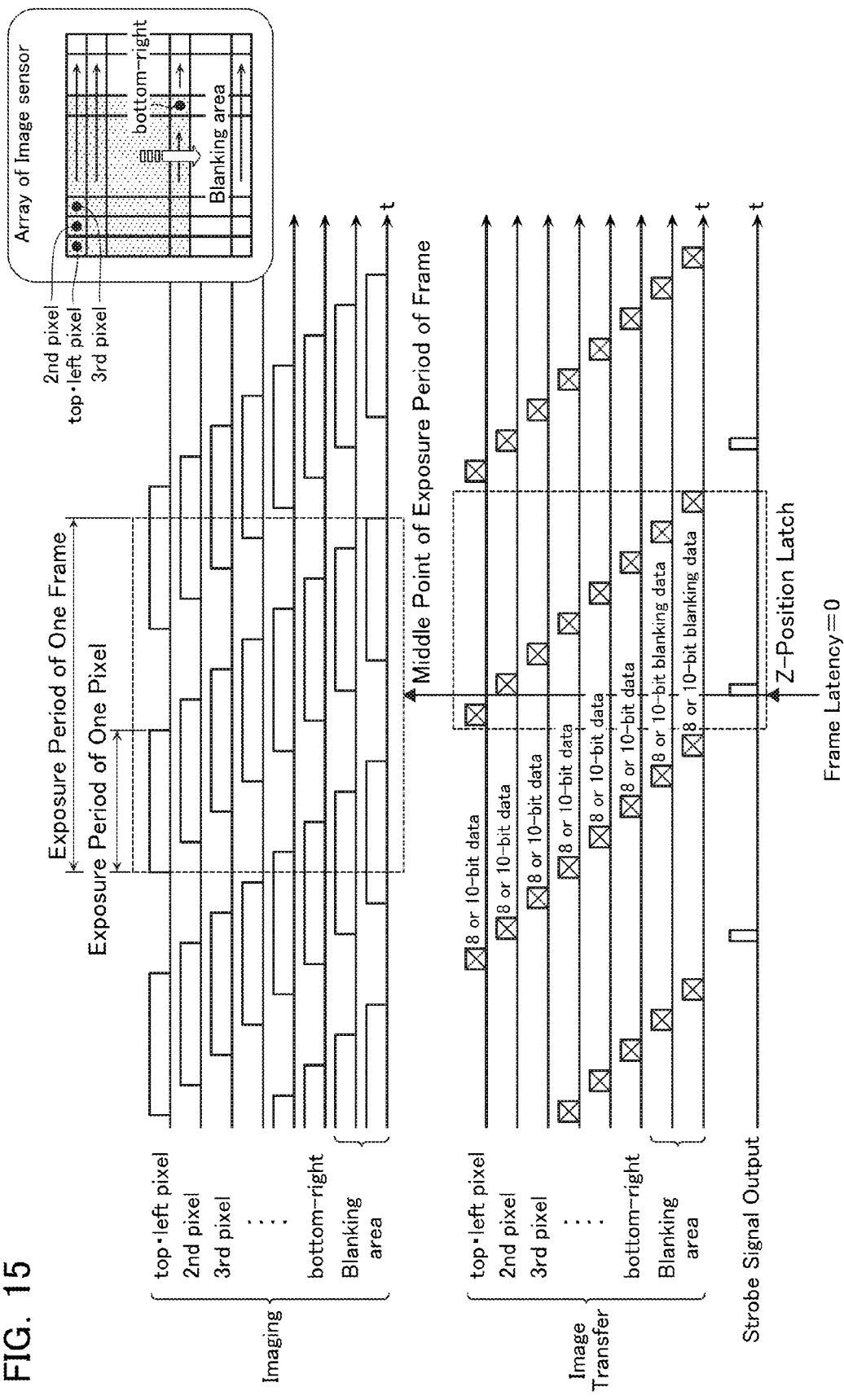
FIG. 15 is a timing chart showing timings at which the same vision measuring device outputs a strobe signal.
Figure 16:
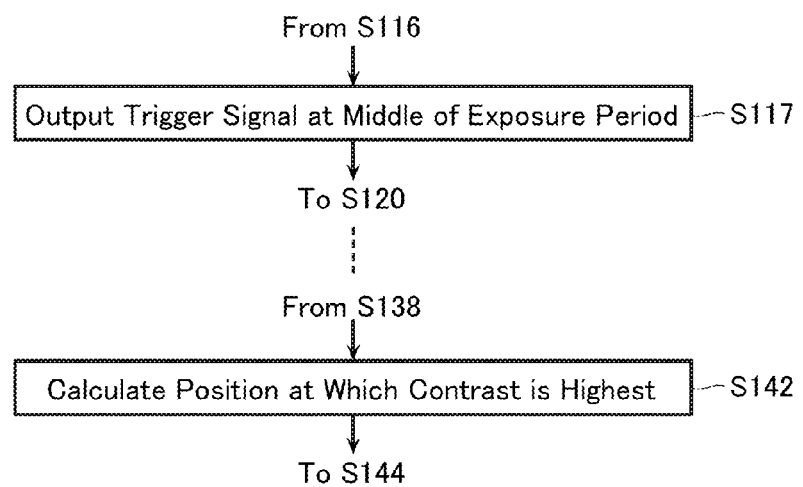
FIG. 16 is a flowchart showing procedures of an auto-focusing control process of the same vision measuring device.
Figure 17:
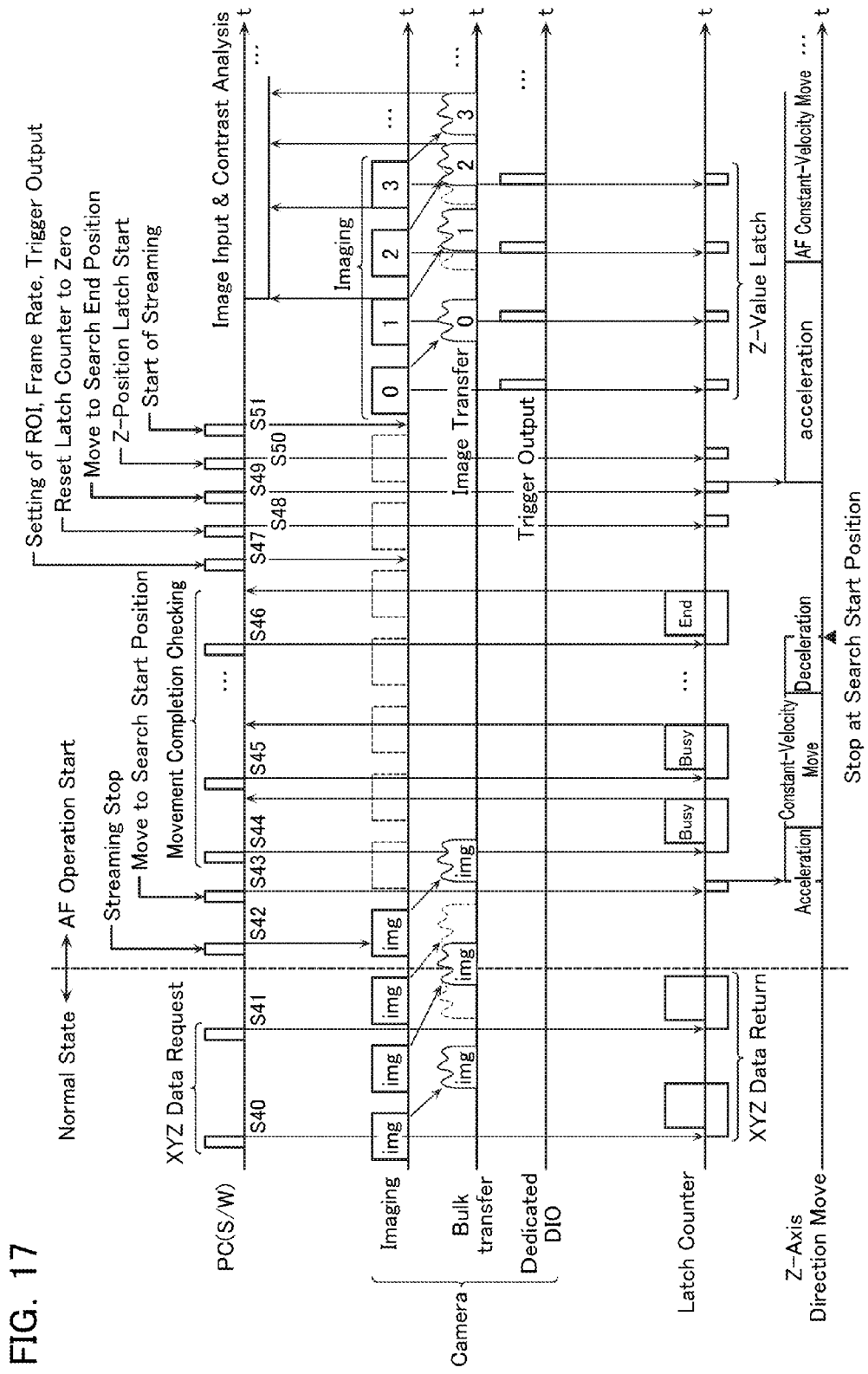
FIG. 17 is a timing chart showing procedures of an auto-focusing control process of the same vision measuring device.
Figure 18:
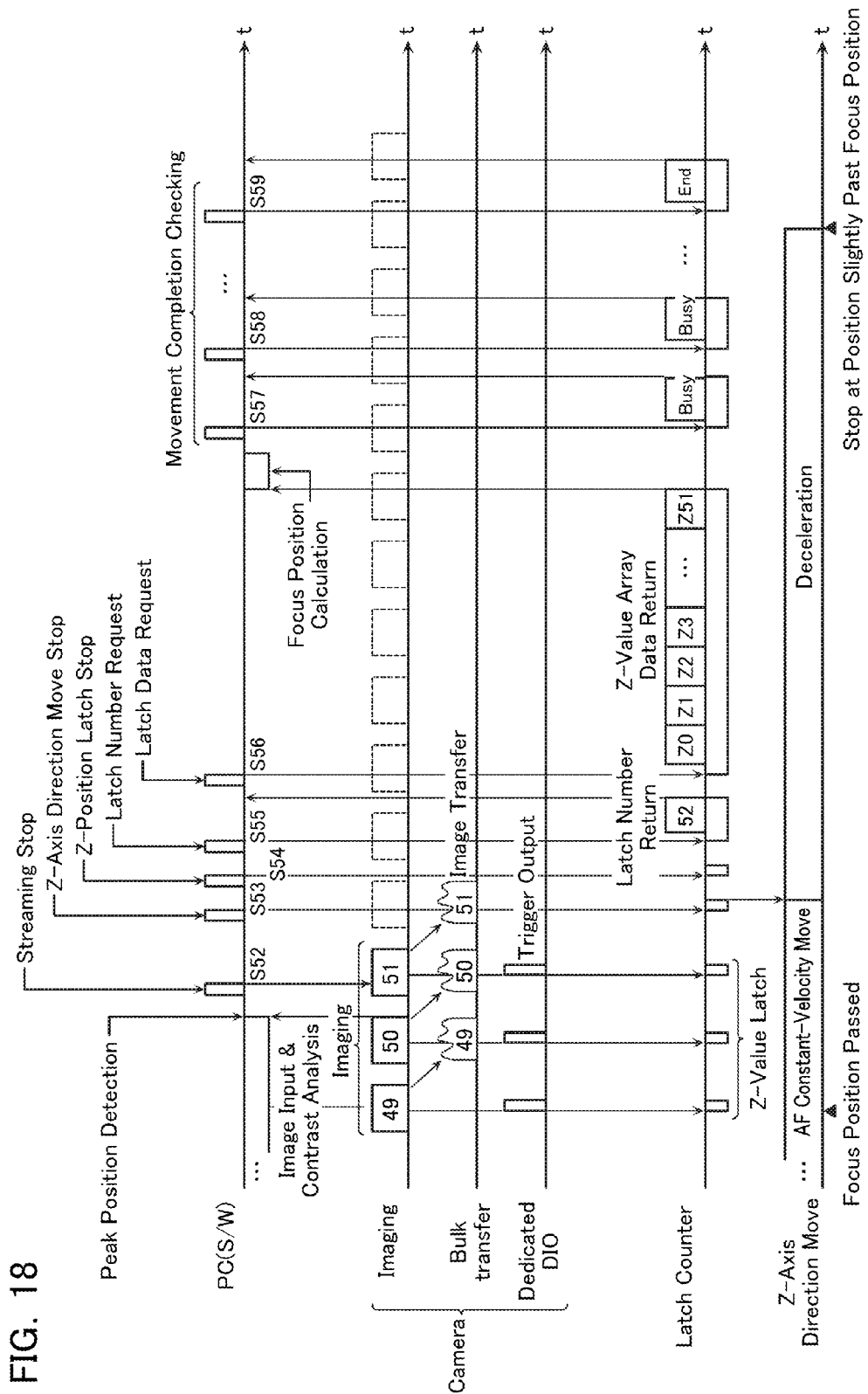
FIG. 18 is a timing chart showing procedures of an auto-focusing control process of the same vision measuring device.

FIG. 14 and FIG. 15 are timing charts showing timings at which the vision measuring device according to the second embodiment of the present invention outputs a strobe signal. FIG. 16 is a flowchart showing procedures of an auto-focusing control process of the vision measuring device. FIG. 17 and FIG. 18 are timing charts showing procedures of the auto-focusing control process of the vision measuring device. In the following description, any portions that overlap already explained portions will be denoted by the same reference numerals and explanation about such portions will not be provided, and explanation about any portions that have no specific relevance to the present invention will not be provided.

The vision measuring device according to the second embodiment has the same configuration as the device of the first embodiment, but is different from the device of the first embodiment in the timing to output a strobe signal (a flashlight emission signal) as a trigger signal.

Namely, as shown in FIG. 14 and FIG. 15, in both the cases when the camera 141 is configured by a CCD of a global shutter type and when the camera 141 is configured by a CMOS of a rolling shutter type, a strobe signal is output at the middle point of an exposure period of one imaging frame, i.e., at when FL is 0. The Z-position at this middle point is latched by the position control unit 151.

As can be understood, in the second embodiment, even if the transfer of image information from the camera 141 to the PC 2 is delayed, the Z-position corresponding to each image information is latched by the position control unit 151 in response to a strobe signal that is output at the middle point of the imaging period. Hence, like in the first embodiment, it is possible to perform an auto-focusing operation highly accurately and without fault by calculating the peak position of the contrast curve CUV correctly.

Specifically, the auto-focusing operation according to the second embodiment is performed as follows, for example. In the following, the auto-focusing operation will be explained with reference to the flowchart of FIG. 16 together with the flowcharts of FIG. 10A and FIG. 10B used in the first embodiment, and with reference to the timing chart of the foregoing FIG. 13 together with the timing charts of FIG. 17 and FIG. 18.

As shown in FIG. 17 and FIG. 10A, the procedures of the above-described steps from S100 to S116 which are performed at the timings S40 to S51 are the same as in the first embodiment, and when the camera 141 images the auto-focusing target region of the workpiece 3 (step S116), it outputs a strobe signal to the position control unit 151 at the middle point of the exposure period (step S117) as shown in FIG. 16.

After this step S117, as shown in FIG. 10A, FIG. 10B, and FIG. 16 to FIG. 18, the flow goes to step S120 described above and the procedures up to step S138 described above are performed at the timings up to the timing S56. Then, the flow jumps from step S138 to step S142 described above by skipping step S140 described above, and the subsequent steps are performed. Then, the auto-focusing operation ends at the timing shown in FIG. 13.

As can be understood, according to the vision measuring device according to the second embodiment, even if the transfer of image information from the camera 141 is delayed by a communication confliction, etc., the PC 2 can obtain the focus position by calculating the peak position of the contrast curve CUV correctly based on the Z-positions corresponding to the respective pieces of image information latched by the position control unit 151 in response to a strobe signal output at the middle point of the imaging period. Hence, like in the first embodiment, it is possible to perform auto-focusing highly accurately and without fault.

Third Embodiment

Figure 19:
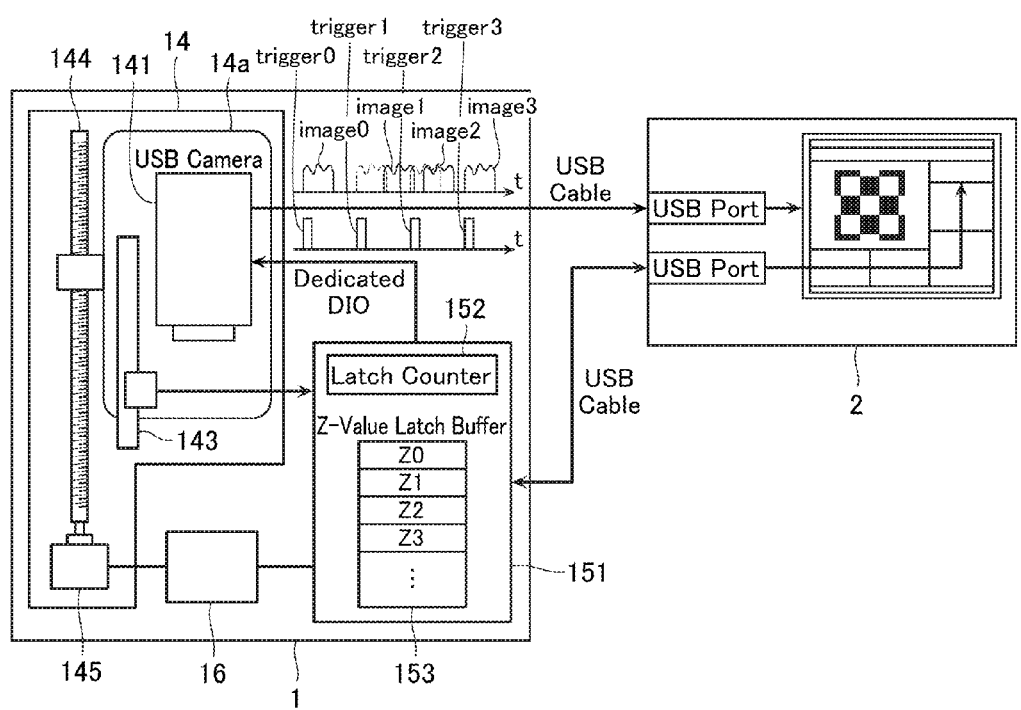
FIG. 19 is a block diagram showing some components of a vision measuring device according to a third embodiment of the present invention.
Figure 20:
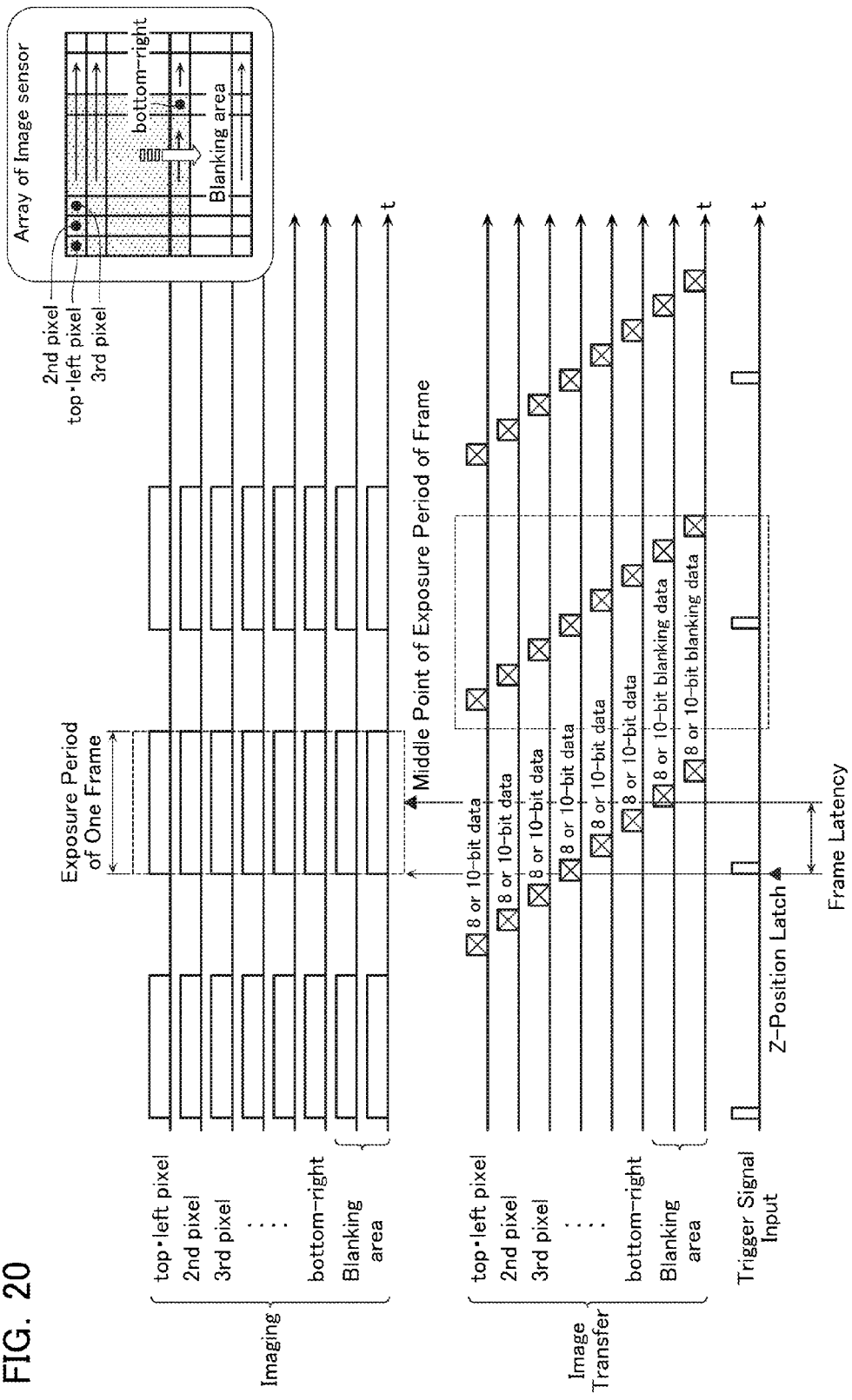
FIG. 20 is a timing chart showing timings at which the same vision measuring device receives a trigger signal.
Figure 21:
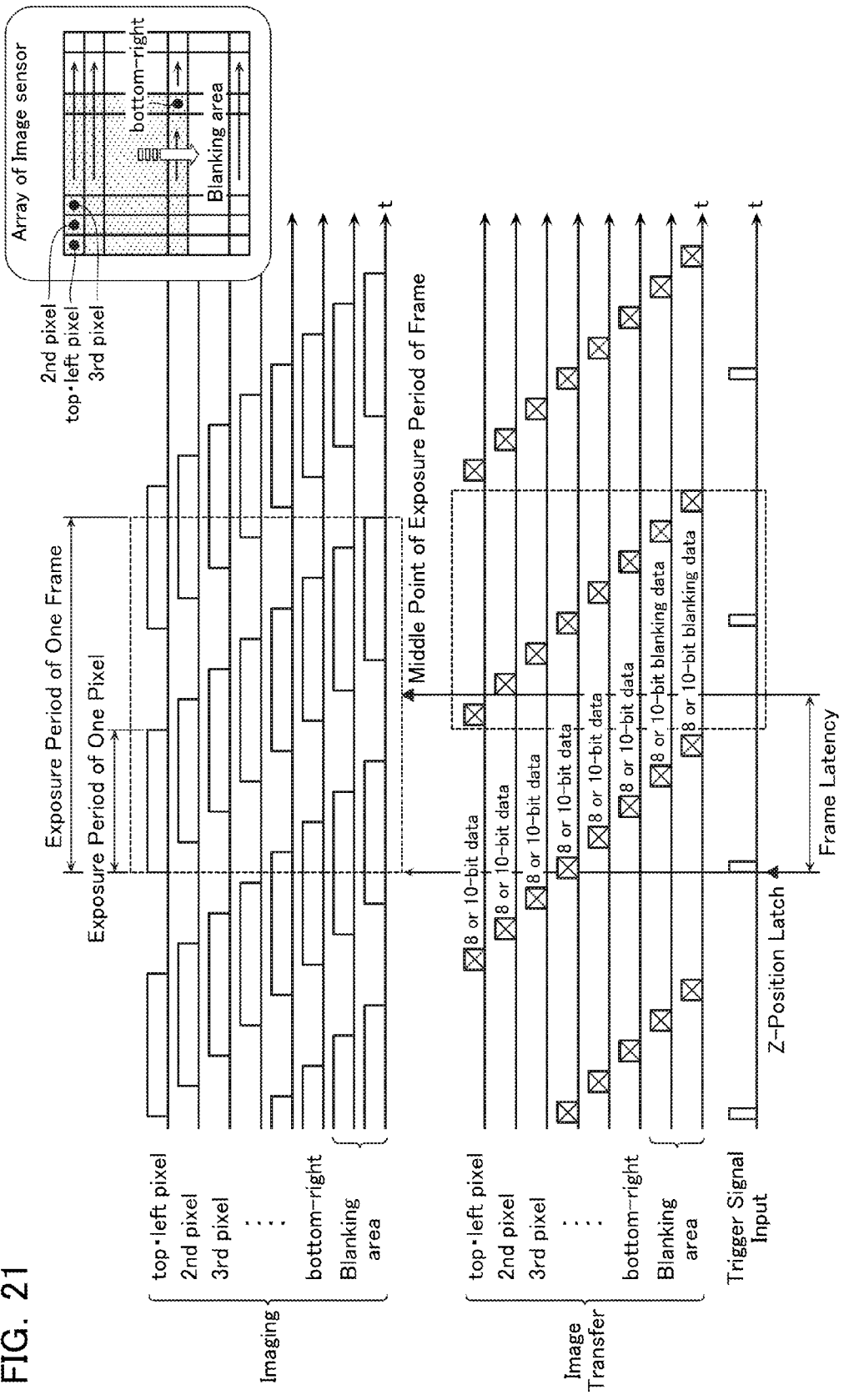
FIG. 21 is a timing chart showing timings at which the same vision measuring device receives a trigger signal.
Figure 22:
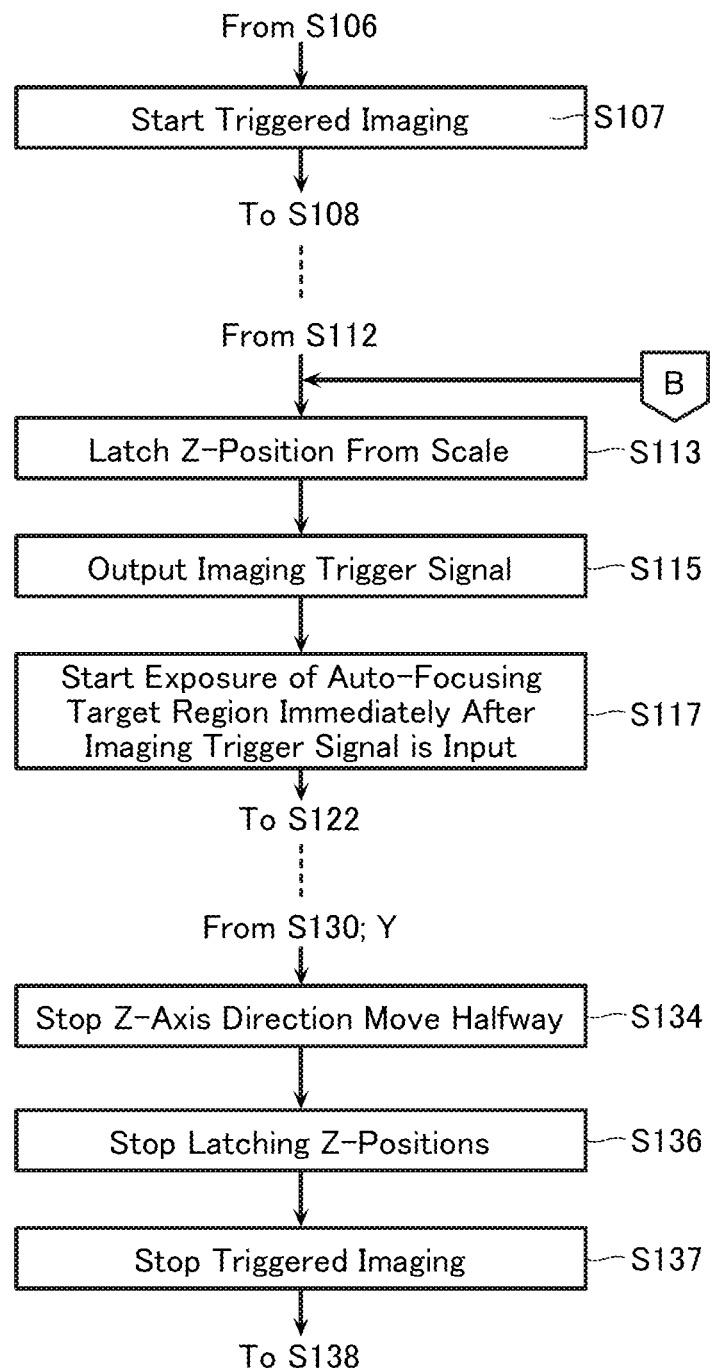
FIG. 22 is a flowchart showing procedures of an auto-focusing control process of the same vision measuring device.
Figure 23:
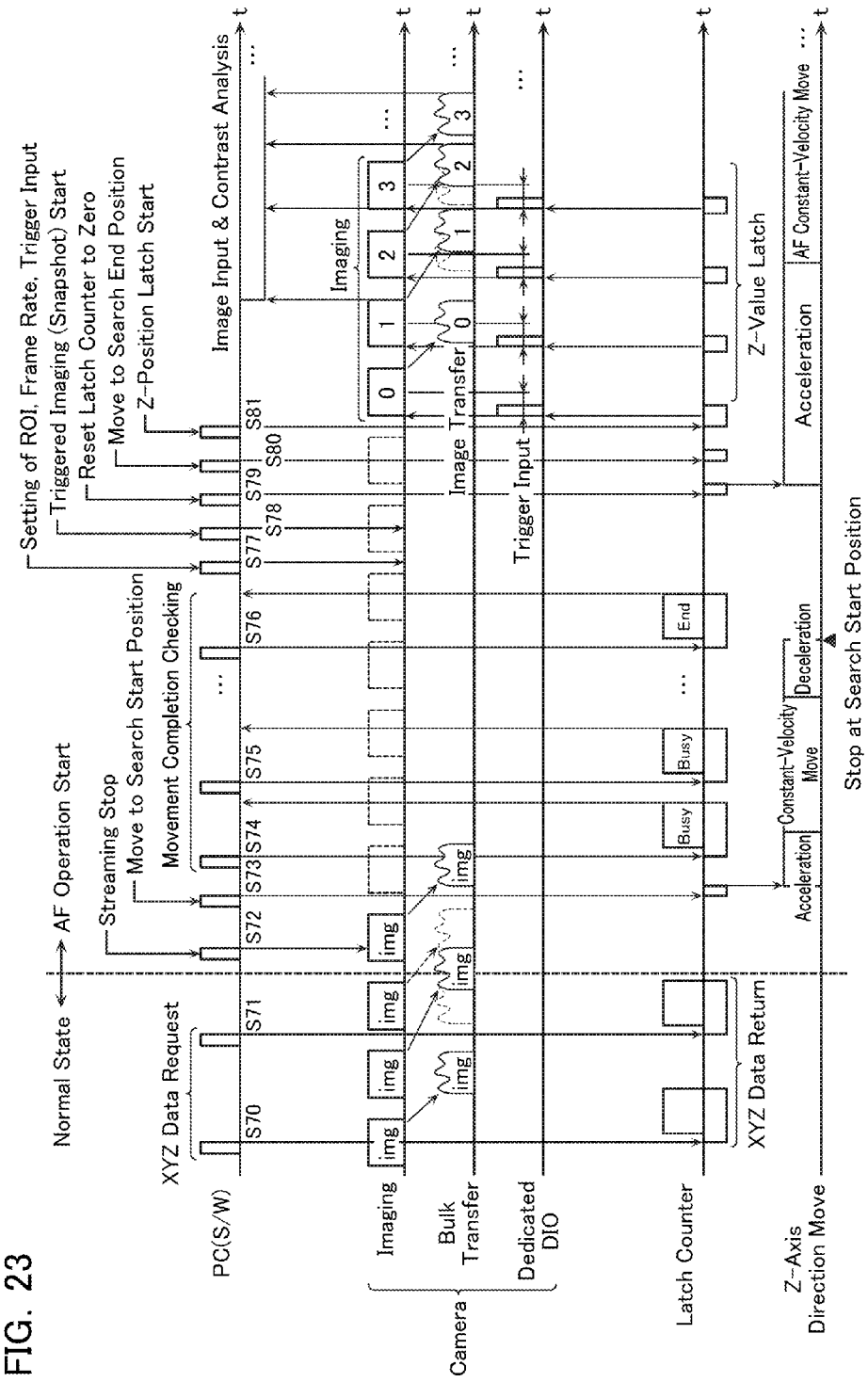
FIG. 23 is a timing chart showing procedures of an auto-focusing control process of the same vision measuring device.
Figure 24:
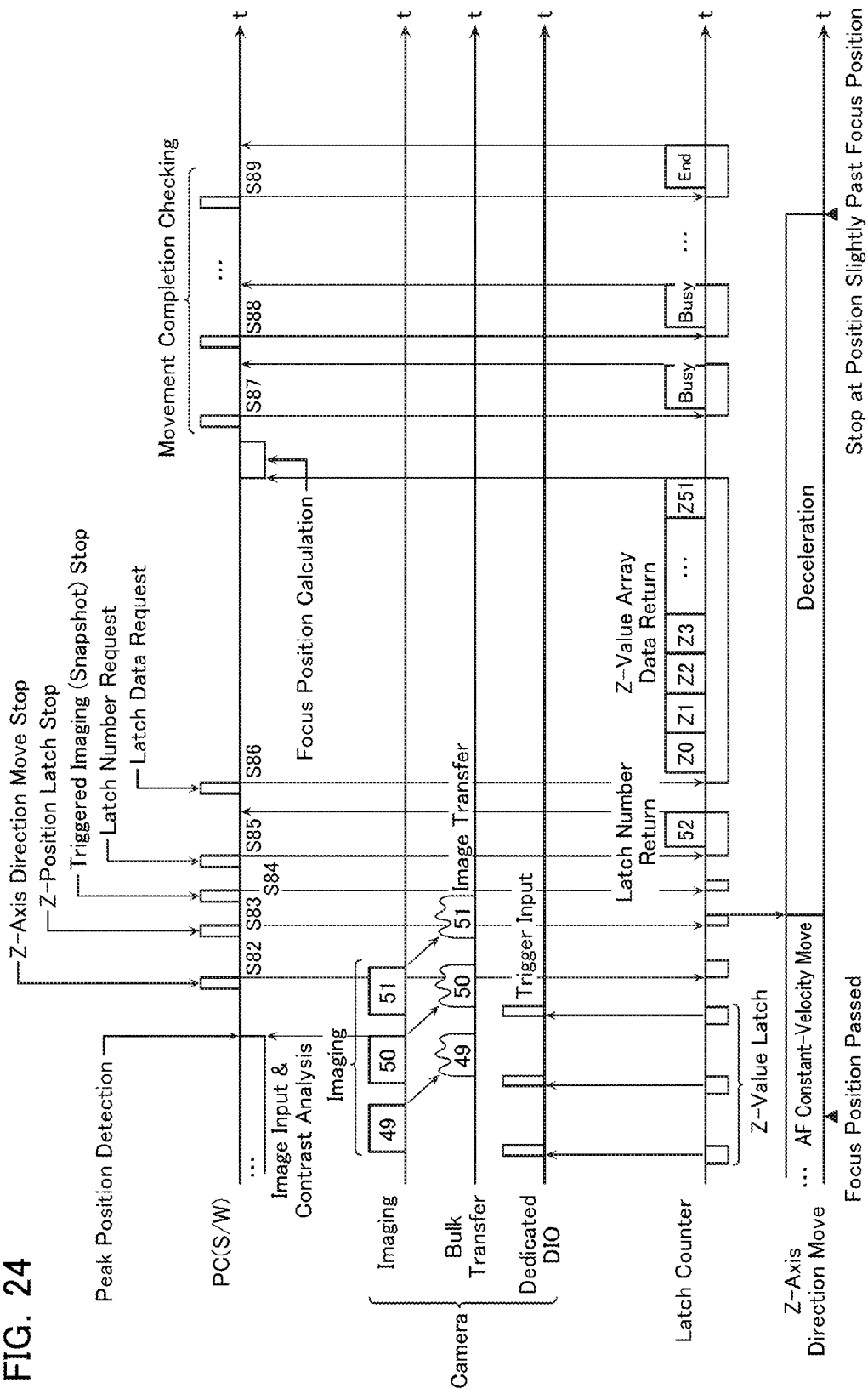
FIG. 24 is a timing chart showing procedures of an auto-focusing control process of the same vision measuring device.

FIG. 19 is a block diagram showing some components of a vision measuring device according to the third embodiment of the present invention. FIG. 20 and FIG. 21 are timing charts showing timings at which the vision measuring device receives a trigger signal. FIG. 22 is a flowchart showing procedures of an auto-focusing control process of the vision measuring device. FIG. 23 and FIG. 24 are timing charts showing procedures of an auto-focusing control process of the vision measuring device.

The vision measuring device according to the third embodiment has the same configuration as the first and second embodiments, but is different from the first and second embodiments in employing a camera slave scheme in which an imaging start instruction (imaging trigger) signal to be output from the position control unit 151 to the camera 141 is used as a trigger signal, as shown in FIG. 19.

Namely, as shown in FIG. 20 and FIG. 21, in both the cases when the camera 141 is configured by a CCD of a global shutter type and when the camera 141 is configured by a CMOS of a rolling shutter type, a trigger signal output from the position control unit 151 at the start of an exposure period of one imaging frame that is ahead of the middle point of the exposure period by FL is input into the camera 141. The position control unit 151 latches a Z-position at the same time as outputting the trigger signal.

As can be understood, in the third embodiment, even if the transfer of image information from the camera 141 to the PC 2 is delayed, a Z-position corresponding to each image information is latched by the position control unit 151, because the camera 141 performs imaging after it receives a trigger signal output from the position control unit 151, and the position control unit 151 latches a Z-position at the same time as outputting this trigger signal. Hence, like in the first and second embodiments, it is possible to perform a highly accurate auto-focusing operation without fault by calculating the peak position of the contrast curve CUV correctly.

Specifically, the auto-focusing operation according to the third embodiment is performed as follows, for example. In the following, the auto-focusing operation according to the third embodiment will be explained with reference to the flowchart of FIG. 22 together with the flowcharts of FIG. 10A and FIG. 10B used in the first and second embodiments, and with reference to the timing charts of the foregoing FIG. 13 together with the timing charts of FIG. 23 and FIG. 24.

As shown in FIG. 23 and FIG. 10A, the procedures from the above-described steps S100 to S106 which are performed at the timings S70 to S77 are the same as in the first and second embodiments, but when changing the imaging settings at step S106, in addition to those setting changes described above, a setting change is also made to the imaging mode, to a trigger receiving mode.

Then, once the imaging settings of the camera 141 are changed, a triggered imaging (Snapshot) start instruction is sent from the PC 2 at the timing S78, and the camera 141 starts triggered imaging (step S107), as shown in FIG. 22. Triggered imaging is for the camera 141 to transfer one frame of image information upon request from the PC 2, at a maximum frame rate of approximately ½ of the maximum frame rate of streaming.

After this step S107, as shown in FIG. 10A, FIG. 10B, FIG. 22, and FIG. 23, the flow goes to step S108 described above and performs the procedures up to step S112 described above at the timings up to the timing S81. When latching is started at step S112, the position control unit 151 latches a Z-position from the scale of the linear encoder 143 (step S113), and at the same time, outputs an imaging trigger signal to the camera 141 (S115).

The camera 141 receives the imaging trigger signal sent from the position control unit 151, and immediately after receiving the imaging trigger signal, starts exposure of the auto-focusing target region (step S117) to image the workpiece 3. After this step S117, the flow goes to step S122 described above to perform the procedures up to step S130 described above, and judges whether or not a contrast value is equal to or lower than a value obtained by subtracting a certain threshold value from the highest contrast value, i.e., whether or not the camera 141 has passed the peak position. Note that in the third embodiment, when it is judged that the contrast value is not equal to or lower than the value obtained by subtracting the certain threshold value from the highest contrast value (step S130; N), the flow goes to step S113 described above, unlike in the case shown in FIG. 10A.

When it is judged that the contrast value is equal to or lower than the value obtained by subtracting the certain threshold value from the highest contrast value (step S130; Y), as shown in FIG. 22 and FIG. 24, the procedures of steps S134 and S136 are performed with step S132 described above skipped, a triggered imaging stop instruction is sent from the PC 2 at the timing S84, and the camera 141 stops triggered imaging (step S137). Then, the flow goes to step S138 described above, the subsequent procedures are performed, and the auto-focusing operation ends at the timing shown in FIG. 13.

As can be understood, according to the vision measuring device according to the third embodiment, even if the transfer of image information from the camera 141 is delayed by a communication confliction, etc., the camera 141 starts imaging in response to a trigger signal output from the position control unit 151, and the position control unit 151 latches a Z-position at the same time as outputting the trigger signal. Hence, the PC 2 can obtain the focus position by calculating the peak position of the contrast curve CUV correctly based on the Z-positions corresponding to the respective pieces of image information latched by the position control unit 151. Hence, like in the first and second embodiment, it is possible to perform auto-focusing highly accurately and without fault.

Fourth Embodiment

Figure 25:
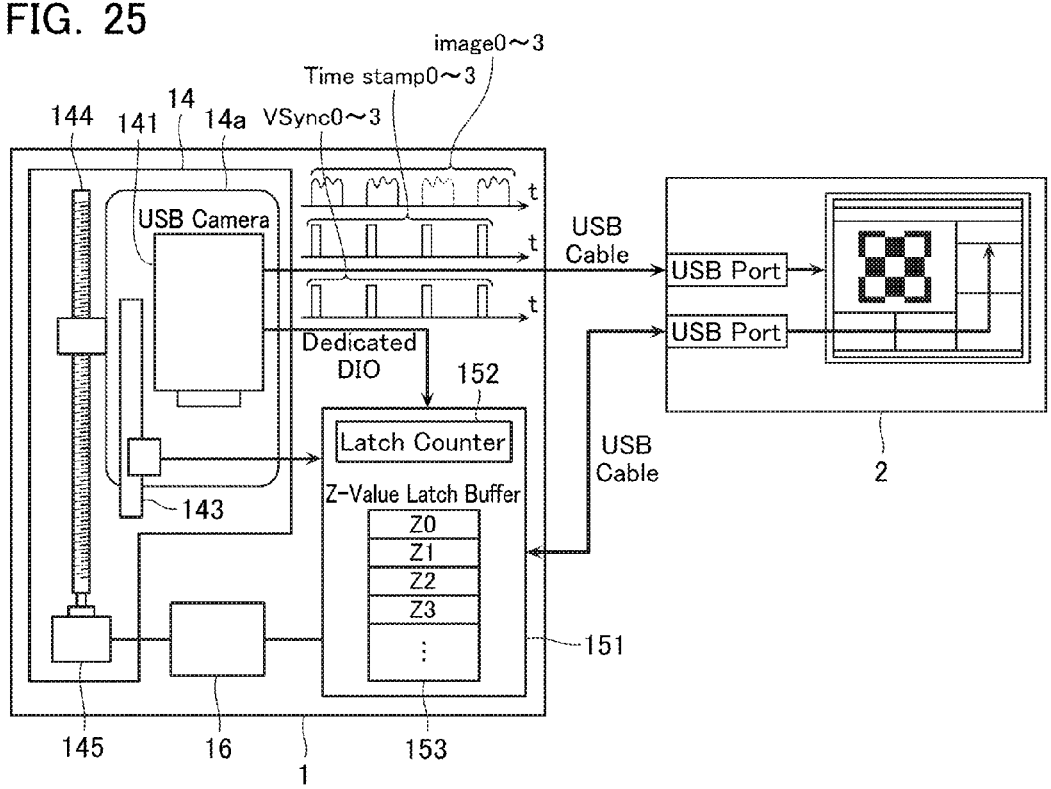
FIG. 25 is a block diagram showing some components of a vision measuring device according to a fourth embodiment of the present invention.
Figure 26:
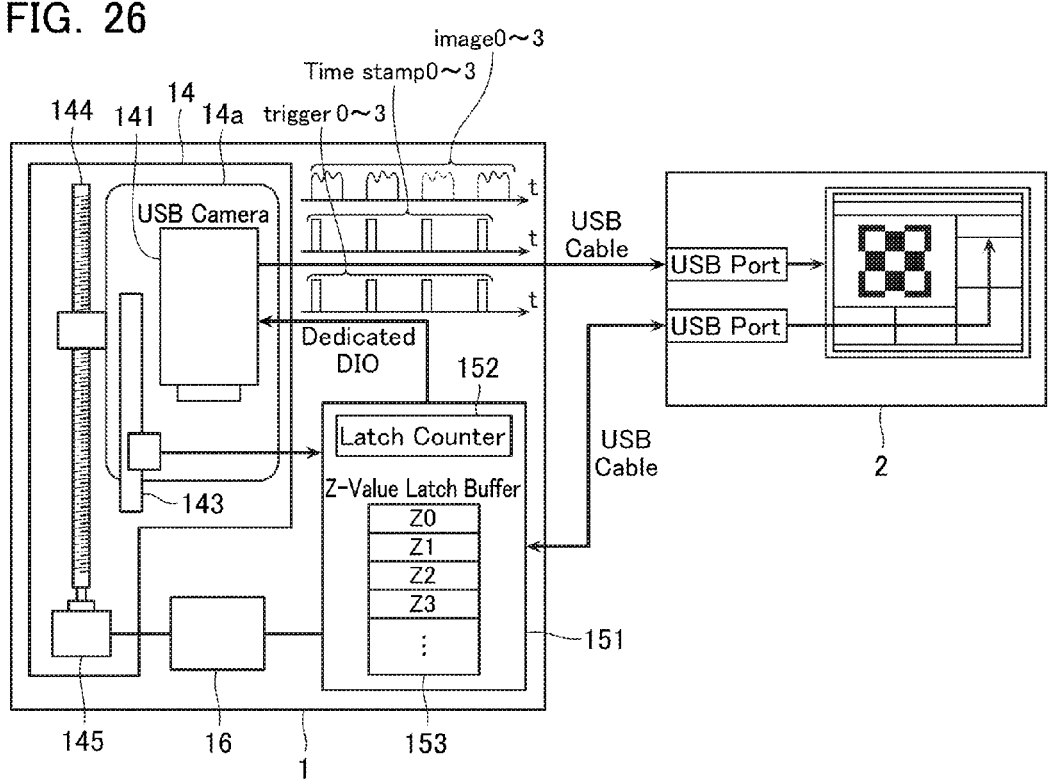
FIG. 26 is a block diagram showing some components of the same vision measuring device.
Figure 27:
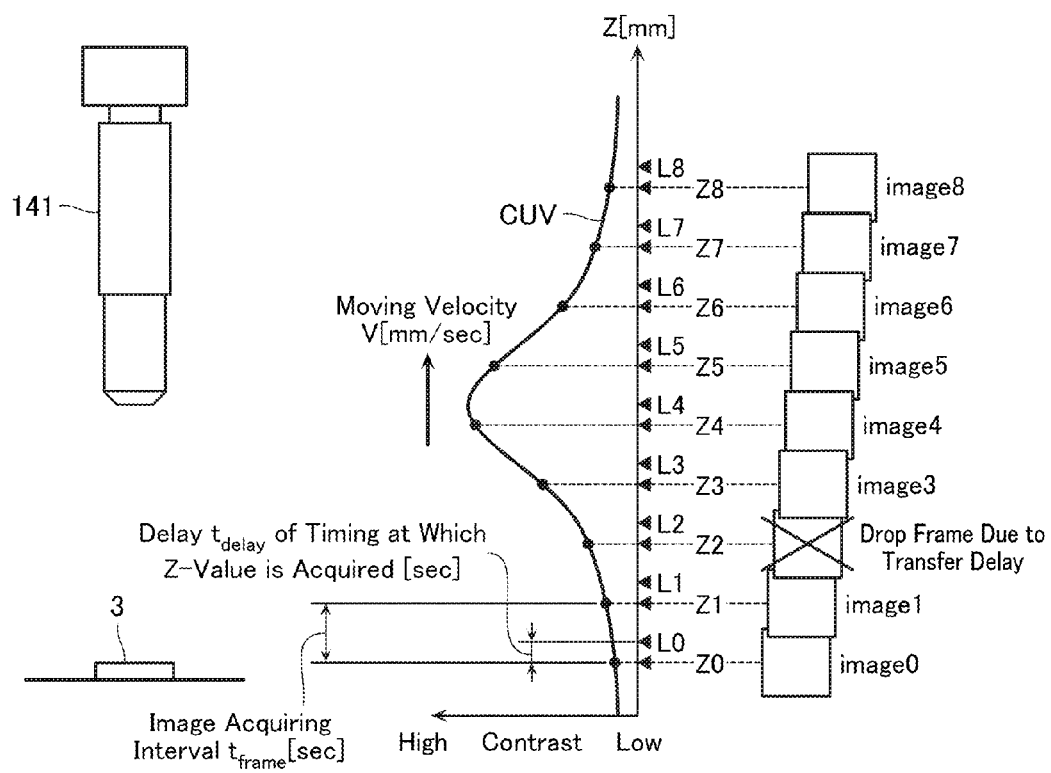
FIG. 27 is a diagram showing an auto-focusing method of the same vision measuring device.

FIG. 25 and FIG. 26 are block diagrams showing some components of a vision measuring device according to the fourth embodiment of the present invention. FIG. 27 is a diagram showing an auto-focusing method of the vision measuring device. FIG. 25 shows the configuration of a case when a vertical synchronization signal is used based on the camera master scheme described above, and FIG. 26 shows the configuration of a case when an imaging start instruction signal is used based on the camera slave scheme described above.

In the vision measuring device according to the fourth embodiment, serial number information (time stamp), which is a running number counted from when imaging is started, is added to image information acquired by the camera 141, at the same time as an output of a trigger signal, such as a vertical synchronization signal to be output from the camera 141 as shown in FIG. 25 or an imaging start instruction signal to be output from the position control unit 151 as shown in FIG. 26.

Namely, the camera 141 adds serial number information (Timestamp0 to 3) to image information (image0 to 3) in conjunction with a vertical synchronization signal (Vsync0 to 3) or an imaging start instruction signal (trigger0 to 3). Also in this case, in response to the trigger signal, a Z-value associated with a serial number is latched by the position control unit 151 in the Z-value latch buffer 153, as described above.

Hence, even if, for example, image information image2 drops while images are transferred from the camera 141 to the PC 2, the PC 2 can be aware of the missing of the image2 by keeping track of the serial number information of the image information numbered by the camera 141. That is, although pieces of image information are transferred in the wrong order (although image2 is lost), correct associations can be made between the pieces of image information and Z-values based on the serial number information representing running numbers. Therefore, by calculating contrasts from the correctly associated Z-value data, etc., it is possible to obtain such a contrast curve CUV as shown in FIG. 27.

In this case, the Z-position of image information can be calculated by the following expression.

$$Z_i = \{L_{i+1} \cdot t_{delay} - L_i (t_{frame} - t_{delay})\}/t_{frame} + L_i \quad \text{[Expression 2]}$$

where t is serial number information

As can be understood, also the vision measuring device according to the fourth embodiment can obtain, based on the serial number information added to each image information, a Z-position corresponding to the image information latched in response to a trigger signal, even if a drop frame occurs while image information is transferred from the camera 141 due to a communication confliction, etc. Hence, it is possible to obtain the focus position by calculating the peak position of the contrast curve CUV correctly and perform auto-focusing highly accurately and without fault. Because the time length of the image acquiring interval is a known value, the serial number may be an actual timing (msec), an internal clock value, etc. In this case, the serial number is calculated by the following formula.

Serial number=floor((actual timing)/(time length of acquiring interval)+0.5)

where floor is a function for rounding down decimals for round-off

Fifth Embodiment

A vision measuring device according to the fifth embodiment employs the camera master scheme using a trigger signal and has the same configuration as that of the first embodiment shown in FIG. 1 to FIG. 3, but the position control unit 151 includes a latch counter 152 which acquires a Z-coordinate of the camera 141 as a Z-value which is position information.

Namely, the position control unit 151 is configured such that the latch counter 152 acquires Z-coordinate information of the camera 141 from the linear encoder 143 in response to the trigger signal, and the Z-value latch buffer 153 retains the acquired Z-coordinate information as a Z-value. The Z-axis motor 145 drives the camera 141 by means of the camera driving mechanism 144.

In the case of the camera master scheme, the position control unit 151 receives a vertical synchronization signal described above, and in response to this, the latch counter 152 acquires the Z-coordinate of the camera 141 from the linear encoder 143 and retains it in the Z-value latch buffer 153. In the fifth embodiment, an analog communication device (NTSC output, composite output) may be used instead of a digital serial standard. When an analog communication device is used, the PC 2 obtains the images through a frame grabber.

The vision measuring device configured as described above performs such an auto-focusing process as shown in FIG. 5 in, for example, the way described below in accordance with an auto-focusing control method according to the present invention. In an auto-focusing process, first, the camera 141 is moved to, for example, a downward auto-focusing start position close to the workpiece 3. Then, while the camera 141 is moved upward at a certain moving velocity, imaging is performed at a plurality of Z-coordinates (Z0 to Z8) at constant image acquiring intervals.

However, although imaging is performed at the nine Z-coordinates (Z0 to Z8) as described above, Z-values to be actually latched by the position control unit 151 are gapped from the Z-coordinates (Z0 to Z8) due to the influence of a delay of the timing at which a Z-value is acquired (i.e., due to an amount of gap between the middle point of an imaging period (exposure period) and the timing at which a z-value is acquired). This makes it impossible to obtain a correct contrast curve CUV. The vision measuring device according to the fifth embodiment is configured to be able to calculate the peak position of a contrast curve CUV correctly by compensating for such a gap in advance and latching a Z-position in response to a vertical synchronization signal. At the timing S2 shown in FIG. 6, the Z-coordinate of the camera 141 at the image acquiring timing is retained in response to a vertical synchronization signal.

Figure 28:
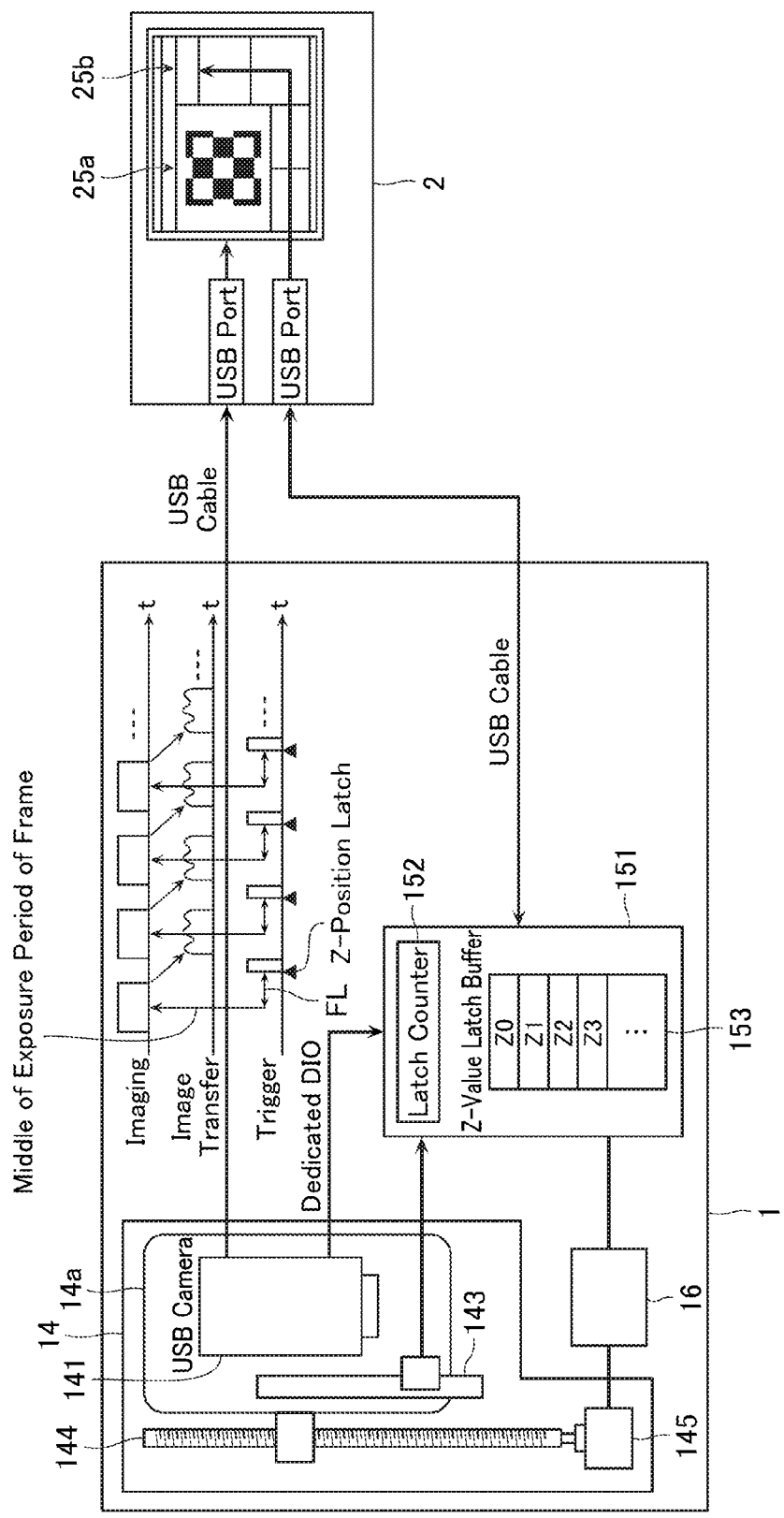
FIG. 28 is a block diagram showing some components of a vision measuring device according to a camera master scheme using a trigger signal according to a fifth embodiment of the present invention.
Figure 29:
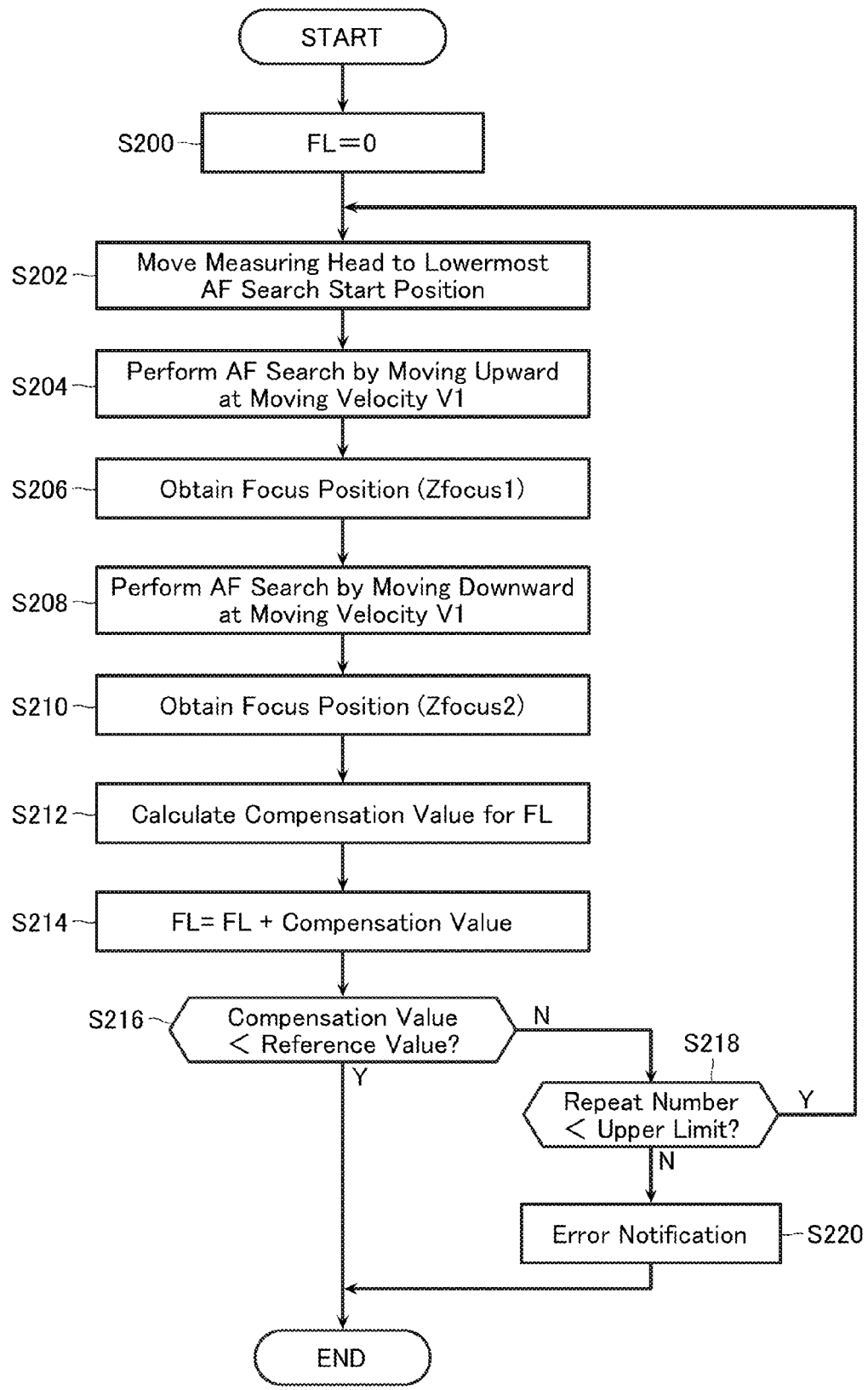
FIG. 29 is a flowchart showing procedures of a compensation value calculation process as a part of an auto-focusing control process of the same vision measuring device.
Figure 30:
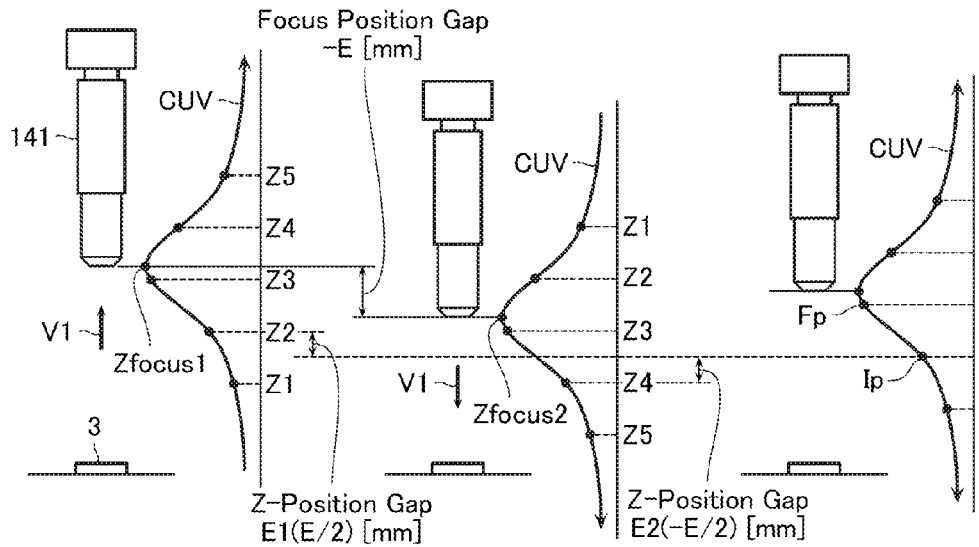
FIG. 30 is an explanatory diagram showing a part of the same calculation process.

Next, a process for compensating for the gap included in an auto-focusing process using a vertical synchronization signal according to the fifth embodiment, which is based on the camera master scheme, will be explained. FIG. 28 is a block diagram showing some components of the vision measuring device based on the camera master scheme using a vertical synchronization signal as a trigger signal. FIG. 29 is a flowchart showing procedures of a compensation value calculation process, which is a part of an auto-focusing control process of the vision measuring device. FIG. 30 is an explanatory diagram showing a part of the calculation process. Timing charts showing the gap between an image acquiring timing of the vision measuring device and a timing at which a Z-value is acquired are the same as FIG. 8 and FIG. 9.

Here, the configuration shown in FIG. 28 is the same as that shown in FIG. 3. In this case, as described above, image information (image) is transferred to the PC 2, a vertical synchronization (Vsync) signal is output to the position control unit 151 at the same time, and a Z-coordinate (Z-position) at this timing is latched by the position control unit 151.

Namely, when the camera 141 is configured by a CCD of a global shutter type as shown in FIG. 8, a vertical synchronization signal is output from the camera 141 at the end of an exposure period (imaging period) of one imaging frame which is subsequent to the middle (middle point) of the exposure period by an amount of gap (=Frame Latency; hereinafter referred to as "FL") between an image acquiring timing at the middle point and the timing at which a Z-position is actually acquired. The Z-coordinate (Z-position) at this end of the exposure period is latched by the position control unit 151.

On the other hand, when the camera 141 is configured by a CMOS of a rolling shutter type as shown in FIG. 9, a vertical synchronization signal is output from the camera 141 at the end of an exposure period of one pixel, which end is ahead of the middle point of an exposure period of one frame by FL. The Z-position at this end of the exposure period of one pixel is latched by the position control unit 151.

Hence, in the auto-focusing process, by measuring the FL to calculate a compensated Z-value and use it, it becomes possible to calculate the peak position of a contrast curve CUV correctly without being influenced by any configuration changes or spec changes of the vision measuring machine 1 and perform a highly accurate auto-focusing operation without fault. To be more specific, it is possible to compensate for a Z-value based on the product between the FL and the moving velocity of the camera 141 during the auto-focusing operation.

Furthermore, if the FL is measured in the way described later and compensated Z-values are calculated before the PC 2 finds matches between transferred image information and Z-positions, a highly accurate auto-focusing the compensated values becomes available. The compensation value calculation process in this auto-focusing operation is performed as follows, for example. In the following, the compensation value calculation process according to the fifth embodiment will be explained with reference to FIG. 30 together with the flowchart of FIG. 29.

When the auto-focusing operation is started, the PC 2 resets the FL to 0, for example (step S200), and controls the position control unit 151 to move the measuring head 14a to the lowermost AF search start position (step S202), as shown in FIG. 29. Then, AF search is performed by moving the measuring head 14a upward at a moving velocity V1 (for example, 3 mm/sec) (step S204).

At this time, because the camera 141 moves at the moving velocity V1 in the upward direction to be away from the workpiece 3 as shown in the left of FIG. 30, a Z-value that is gapped from the true image acquiring position Ip shown in the right of FIG. 30 by a Z-position gap of E1(=E/2) mm is latched by the position control unit 151.

When the AF search in the upward direction is completed, the PC 2 obtains a focus position Zfocus1 by performing calculation of a contrast curve CUV based on the acquired Z-values including the compensation process based on the FL (step S206). Next, the measuring head 14a having been moved upward is moved downward at the moving velocity V1 as shown in the middle of FIG. 30 to perform AF search (step S208).

At this time, because the camera 141 moves at the moving velocity V1 in the downward direction to be close to the workpiece 3 as shown in the middle of FIG. 30, a Z-value that is gapped from the true image acquiring position Ip shown in the right of FIG. 30 by a Z-position gap of E2 (=−E/2) mm is latched by the position control unit 151.

When the AF search in the downward direction is completed, the PC 2 obtains a focus position Zfocus2 by performing calculation of a contrast curve CUV based on the acquired Z-values including the compensation process based on the FL (step S210). In this case, the gap between the focus positions Zfocus1 and Zfocus2 is −E mm. Then, the PC 2 calculates a compensation value FLtemp for the FL (step S212). The compensation value FLtemp can be calculated by the following expression.

$$FLtemp = -E/(-2V1) = E/(2V1) = \{(Zfocus2 - Zfocus1)/V1\}/2 \quad \text{[Expression 3]}$$

Then, the PC 2 sets a new FL by adding the calculated compensation value FLtemp to the FL (step S214). Upon setting the FL, the PC 2 judges whether or not the compensation value FLtemp is smaller than a preset reference value (step S216), and when judged that it is smaller (step S216; Y), terminates the series of process according to the present flowchart.

When it is judged that the compensation value FLtemp is not smaller than the reference value (step S216; N), the PC 2 judges whether or not the number of times the AF search has been repeated is smaller than a preset upper limit value (step S218). When judged that it is smaller (step S218; Y), the PC 2 goes to step S202 described above to repeat the process. When judged that it is not smaller (step S218; N), the PC 2 gives an error notification by displaying an error warning on the CRT 25, etc. or in any other way (step S220), and terminates the series of process. The moving directions of the AF search may be other way round.

By performing auto-focusing control by using an FL set by such a process, it becomes possible to automate parameter calibration of the vision measuring device and calibrate a measurement error at a low cost. At the same time, it becomes possible to calculate the peak position of a contrast curve CUV correctly and perform a highly accurate auto-focusing operation without fault even when any configuration changes or spec changes are made in the vision measuring machine 1, the camera 141, etc.

The amount of gap may be calculated as a period of time such as FL, or may be calculated as a distance. In this case, a table from which a travel distance can be obtained based on the moving velocity of the camera 141 and the FL may be previously provided in the PC 2.

Sixth Embodiment

Figure 31:
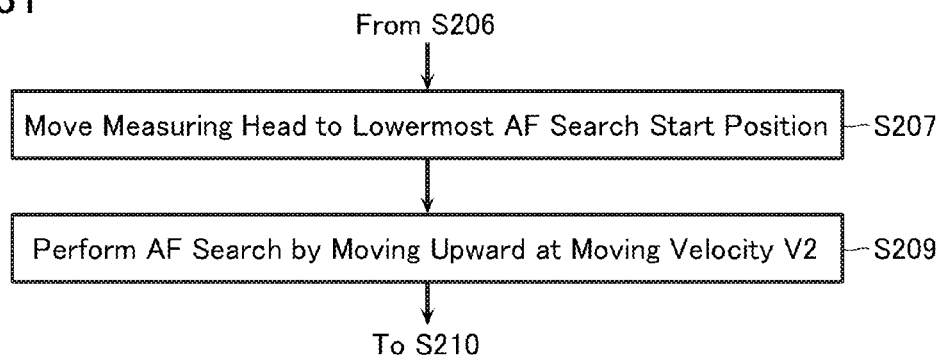
FIG. 31 is a flowchart showing procedures of a compensation value calculation process as a part of an auto-focusing control process of a vision measuring device according to a sixth embodiment of the present invention.
Figure 32:
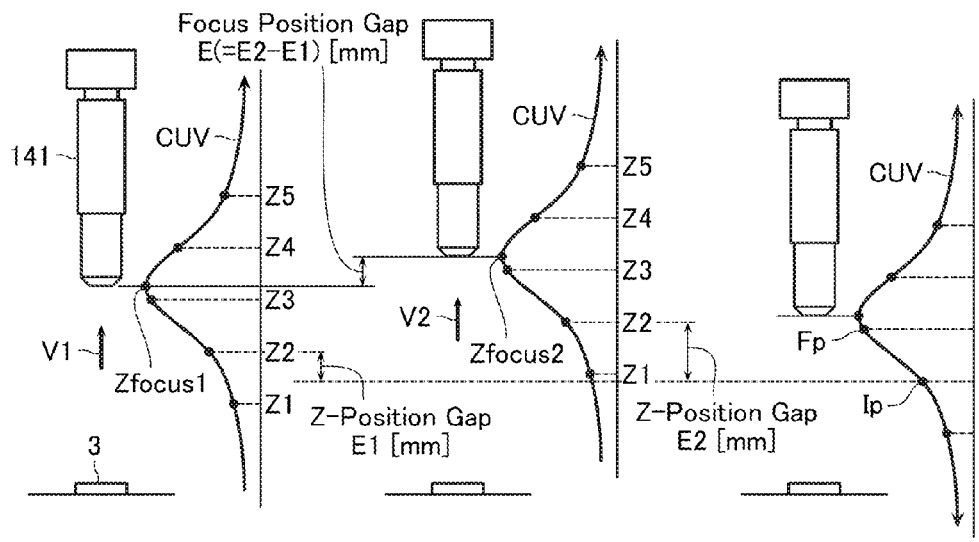
FIG. 32 is an explanatory diagram showing a part of the same calculation process.

FIG. 31 is a flowchart showing procedures of a compensation value calculation process which is a part of an auto-focusing control process of a vision measuring device according to the sixth embodiment of the present invention. FIG. 32 is an explanatory diagram showing a part of the calculation process.

The vision measuring device according to the sixth embodiment is the same as the device according to the fifth embodiment and also the same in using a vertical synchronization signal as a trigger signal, but different from the device of the fifth embodiment in the manner of performing AF search. Namely, AF search is performed in the same moving direction but at different moving velocities. A compensation value calculation process in the auto-focusing operation according to the sixth embodiment is performed as follows, for example. This process will now be explained below with reference to FIG. 32 while also referring to the flowchart of FIG. 31 together with the flowchart of FIG. 29.

As shown in FIG. 29 and FIG. 31, after the procedures of steps S200 to S206 described above, the PC 2 controls the position control unit 151 to move the measuring head 14a again to the lowermost AF search start position (step S207). In these procedures, the camera 141 moves at the moving velocity V1 in the upward direction to be away from the workpiece 3 as shown in the left of FIG. 32, Z-values that are gapped from the true image acquiring position Ip shown in the right of FIG. 32 by a Z-position gap of E1 mm are latched by the position control unit 151, and a focus position Zfocus1 based on a contrast curve CUV is obtained.

Then, AF search is performed by moving the measuring head 14a upward at a moving velocity V2 (for example, 5 mm/sec) different from the moving velocity V1 (step S209). Thereby, Z-values that are gapped from the true image acquiring position Ip by a Z-position gap of E2 mm are latched by the position control unit 151, as shown in the middle of FIG. 32. After this, the flow goes to step S210 described above to obtain a focus position Zfocus2 and perform the subsequent steps shown in FIG. 29.

In this case, the gap between the focus positions Zfocus1 and Zfocus2 is E2-E1 mm. At step S212 described above, the PC 2 calculates a compensation value FLtemp for the FL by the following expression, for example.

$$FLtemp=(E2-E1)/(V2-V1)=E/(V2-V1)=(Zfocus2-Zfocus1)/(V2-V1)$$ [Expression 4]

In the sixth embodiment, the moving direction of the camera 141 during the AF search is upward, but may be downward. Also in this direction, it is possible to automate parameter calibration of the vision measuring device and calibrate any measurement error at a low cost and to perform a highly accurate auto-focusing operation without fault by calculating the peak position of the contrast curve CUV correctly.

Besides, though not so illustrated, an auto-focusing operation may be performed by calculating a compensation value FLtemp based on an FL which is measured by performing AF search by, for example, moving the camera 141 upward at the moving velocity V1 and also moving the camera 141 downward at the moving velocity V2.

Seventh Embodiment

Figure 33:
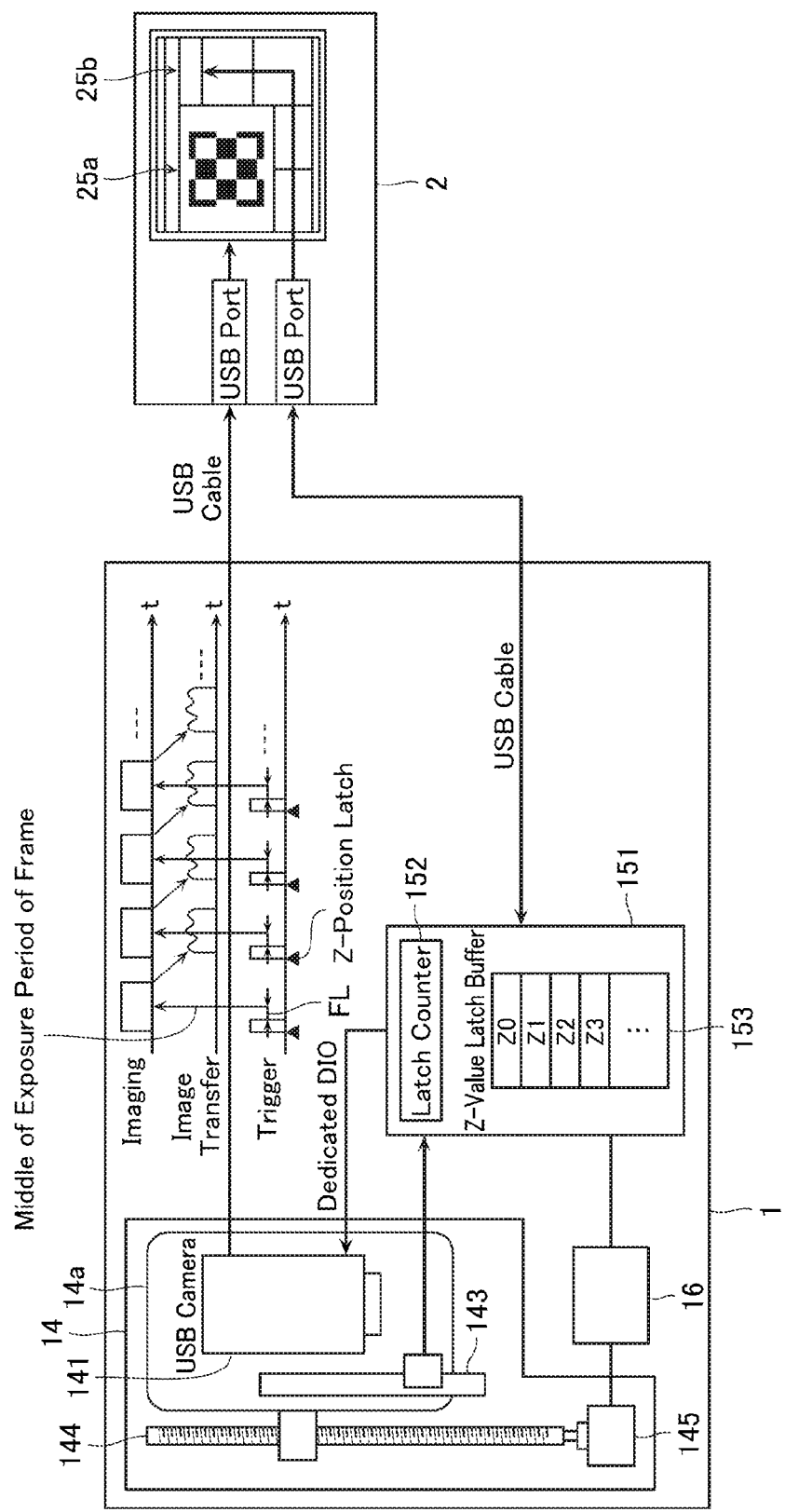
FIG. 33 is a block diagram showing some components of a vision measuring device according to a camera slave scheme using a trigger signal according to a seventh embodiment of the present invention.

FIG. 33 is a block diagram showing some components of a vision measuring device according to the seventh embodiment of the present invention, which is based on the camera slave scheme using a trigger signal. Timing charts showing the gap between an image acquiring timing of the vision measuring device and a timing at which a Z-value is acquired are the same as FIG. 20 and FIG. 21.

The vision measuring device according to the seventh embodiment has the same configuration as the devices of the fifth and sixth embodiments, but is different from the device of the fifth embodiment in employing a camera slave scheme in which a trigger signal is output from the position control unit 151 to the camera 141 through the dedicated DIO cable as shown in FIG. 33.

Namely, as shown in FIG. 20 and FIG. 21, in both the cases when the camera 141 is configured by a CCD of a global shutter type and when the camera 141 is configured by a CMOS of a rolling shutter type, a trigger signal output from the position control unit 151 at the start of an exposure period of one imaging frame that is ahead of the middle point of the exposure period by FL is input into the camera 141. The position control unit 151 latches a Z-position at the same time as outputting the trigger signal. Even with such a configuration, it is possible to automate parameter calibration of the vision measuring device and calibrate any measurement error at a low cost, and to calculate the peak position of a contrast curve CUV correctly and perform a highly accurate auto-focusing operation without fault.

What is claimed is:

1. A vision measuring device, comprising:
   imaging device which images a measurement target and transfers image information representing an image of the measurement target;
   position control device which controls an in-focus position of the imaging device and outputs the in-focus position as position information representing a position in an in-focus axis direction; and
   vision measuring device which performs vision measurement on the measurement target based on the image information and the position information,
   wherein:
   the position control device acquires and retains the position information at a certain imaging timing of the imaging device; and
   the vision measuring device performs plural times of auto-focus searches along the in-focus axis direction by varying at least one of a moving velocity and a moving direction each time, obtains an amount of gap between the imaging timing and a timing at which the position information is acquired based on the image information transferred from the imaging device in each auto-focus search and the position information output from the position control device in each auto-focus search, and compensates for an in-focus position obtained in each auto-focus search based on the obtained amount of gap.

2. The vision measuring device according to claim 1, wherein
   the vision measuring device obtains an in-focus position based on the image information transferred from the imaging device in each auto-focus search and the position information output from the position control device in each auto-focus search, and obtains the amount of gap based on an error between the in-focus positions obtained in the respective auto-focus searches and the moving velocity of the imaging device.

3. The vision measuring device according to claim 2, wherein
   the vision measuring device sets a certain initial value for the amount of gap, calculates a compensation value for compensating for the amount of gap from a difference between the in-focus positions which have been compensated for based on the amount of gap in the respective auto-focus searches, and repeats a process for compensating for the amount of gap based on the compensation value until the compensation value becomes smaller than a certain value.

4. The vision measuring device according to claim 1, wherein
   the amount of gap is obtained by driving the imaging device in a first moving direction and in a second moving direction opposite to the first moving direction at a same moving velocity.

5. The vision measuring device according to claim 1, wherein
   the amount of gap is obtained by driving the imaging device in one moving direction at a first moving velocity and at a second moving velocity different from the first moving velocity.

6. The vision measuring device according to claim 1, wherein
   the amount of gap is obtained by driving the imaging device in a first moving direction at a first moving velocity and in a second moving direction opposite to the first moving direction at a second moving velocity different from the first moving velocity.

7. The vision measuring device according to claim 1, wherein
the amount of gap is a frame latency of the imaging device represented by time.

8. The vision measuring device according to claim 1, wherein
the amount of gap is represented by a distance which is obtained by referring to a table based on the moving velocity and moving direction of the imaging device, a travel distance previously associated with the moving velocity, and a frame latency of the imaging device.

9. An auto-focusing control method of a vision measuring device comprising: imaging device which images a measurement target and transfers image information representing an image of the measurement target; position control device which controls an in-focus position of the imaging device and outputs the in-focus position as position information representing a position in an in-focus axis direction; and vision measuring device which performs vision measurement on the measurement target based on the image information and the position information, the method comprising:

a step of the position control device acquiring and retaining the position information at a certain imaging timing of the imaging device; and a step of the vision measuring device performing plural times of auto-focus searches along the in-focus axis direction by varying at least one of a moving velocity and a moving direction each time, obtaining an amount of gap between the imaging timing and a timing at which the position information is acquired based on the image information transferred from the imaging device in each auto-focus search and the position information output from the position control device in each auto-focus search, and compensating for an in-focus position obtained in each auto-focus search based on the obtained amount of gap.

* * * * *